(12) United States Patent
Saunders et al.

(10) Patent No.: US 12,251,837 B2
(45) Date of Patent: Mar. 18, 2025

(54) INTELLIGENT GRIPPER WITH INDIVIDUAL CUP CONTROL

(71) Applicant: Boston Dynamics, Inc., Waltham, MA (US)

(72) Inventors: John Aaron Saunders, Waltham, MA (US); Christopher Everett Thorne, Waltham, MA (US); Matthew Paul Meduna, Waltham, MA (US); Joshua Timothy Geating, Waltham, MA (US)

(73) Assignee: Boston Dynamics, Inc., Waltham, MA (US)

( * ) Notice: Subject to any disclaimer, the term of this patent is extended or adjusted under 35 U.S.C. 154(b) by 314 days.

(21) Appl. No.: 17/865,882

(22) Filed: Jul. 15, 2022

(65) Prior Publication Data

US 2022/0371189 A1    Nov. 24, 2022

Related U.S. Application Data

(62) Division of application No. 17/124,812, filed on Dec. 17, 2020, now Pat. No. 11,407,103.

(60) Provisional application No. 62/949,424, filed on Dec. 17, 2019.

(51) Int. Cl.
| | |
|---|---|
| *B25J 9/16* | (2006.01) |
| *B25J 9/20* | (2006.01) |
| *B25J 15/06* | (2006.01) |

(52) U.S. Cl.
CPC .......... *B25J 9/1612* (2013.01); *B25J 9/1694* (2013.01); *B25J 9/20* (2013.01); *B25J 15/0633* (2013.01)

(58) Field of Classification Search
CPC . B25J 9/1612; B25J 9/1694; B25J 9/20; B25J 15/0633; B25J 15/0052; B25J 9/1651; B25J 19/02; B25J 15/0658; B25J 15/0683; B25J 15/0625; B25J 15/0616; G05B 2219/39547; G05B 2219/39558; G05B 2219/37399; G05B 2219/39528; G05B 2219/39532

See application file for complete search history.

(56) References Cited

U.S. PATENT DOCUMENTS

| | | | |
|---|---|---|---|
| 7,404,536 B2 | 7/2008 | Kalb | |
| 9,205,558 B1 * | 12/2015 | Zevenbergen | ......... B25J 9/1664 |
| 9,457,477 B1 | 10/2016 | Rublee et al. | |

(Continued)

FOREIGN PATENT DOCUMENTS

| | | |
|---|---|---|
| EP | 3251996 A1 | 12/2017 |
| SE | 1830158 A1 | 11/2019 |

OTHER PUBLICATIONS

Extended European Search Report dated May 14, 2021 in connection with European Application No. 20214566.0.

*Primary Examiner* — Bao Long T Nguyen
(74) *Attorney, Agent, or Firm* — PIERCE ATWOOD LLP

(57) ABSTRACT

Systems and methods related to intelligent grippers with individual cup control are disclosed. One aspect of the disclosure provides a method of determining grip quality between a robotic gripper and an object. The method comprises applying a vacuum to two or more cup assemblies of the robotic gripper in contact with the object, moving the object with the robotic gripper after applying the vacuum to the two or more cup assemblies, and determining, using at least one pressure sensor associated with each of the two or more cup assemblies, a grip quality between the robotic gripper and the object.

18 Claims, 15 Drawing Sheets

(56) References Cited

U.S. PATENT DOCUMENTS

| | | | |
|---|---|---|---|
| 10,335,947 B1* | 7/2019 | Diankov | B25J 15/0004 |
| 11,458,635 B2 | 10/2022 | Wicks et al. | |
| 2017/0197796 A1* | 7/2017 | Dunkmann | G05D 16/2006 |
| 2019/0337163 A1* | 11/2019 | Dunkmann | B25J 15/0616 |

* cited by examiner

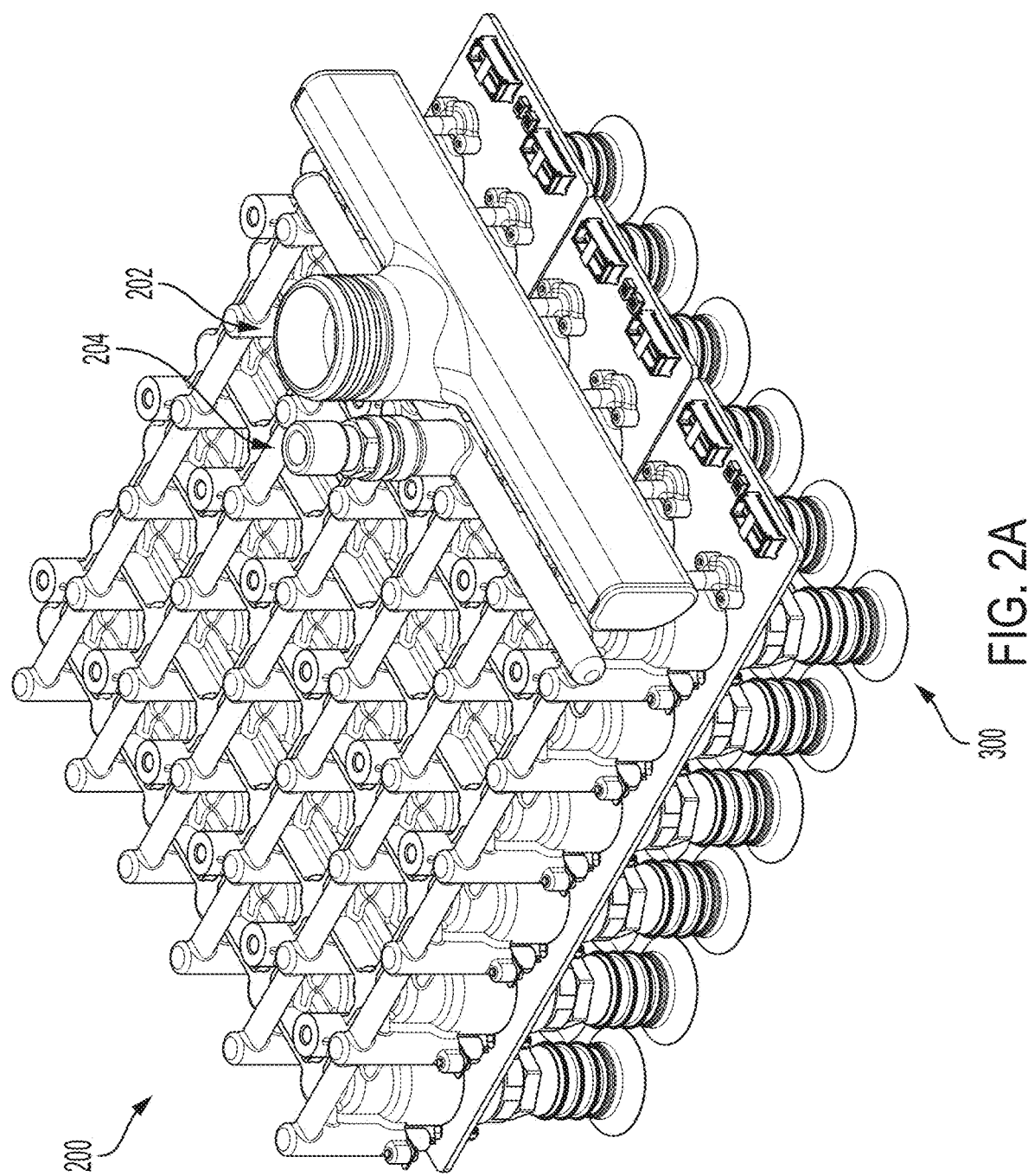

INTELLIGENT GRIPPER WITH INDIVIDUAL CUP CONTROL

CROSS-REFERENCE TO RELATED APPLICATIONS

This application is a Divisional of U.S. patent application Ser. No. 17/124,812 filed Dec. 17, 2020, entitled "Intelligent Gripper with Individual Cup Control," which claims the benefit under 35 U.S.C. § 119 (e) of U.S. provisional application Ser. No. 62/949,424, filed Dec. 17, 2019, and entitled "Intelligent Gripper with Individual Cup Control", the disclosure of each of which is incorporated by reference in its entirety.

BACKGROUND

A robot is generally defined as a reprogrammable and multifunctional manipulator designed to move material, parts, tools, or specialized devices through variable programmed motions for a performance of tasks. Robots may be manipulators that are physically anchored (e.g., industrial robotic arms), mobile robots that move throughout an environment (e.g., using legs, wheels, or traction-based mechanisms), or some combination of a manipulator and a mobile robot. Robots are utilized in a variety of industries including, for example, manufacturing, transportation, hazardous environments, exploration, and healthcare.

SUMMARY

One aspect of the disclosure provides a method of determining grip quality between a robotic gripper and an object. The method comprises applying a vacuum to two or more cup assemblies of the robotic gripper in contact with the object, moving the object with the robotic gripper after applying the vacuum to the two or more cup assemblies, and determining, using at least one pressure sensor associated with each of the two or more cup assemblies, a grip quality between the robotic gripper and the object.

In another aspect, the method further comprises measuring an aggregate wrench on the robotic gripper while moving the object.

In another aspect, the method further comprises selecting based, at least in part, on the measured aggregate wrench, an acceleration for the robotic gripper.

In another aspect, the method further comprises selecting based, at least in part, on the determined grip quality, an acceleration for the robotic gripper.

In another aspect, the method further comprises selecting based, at least in part, on the measured aggregate wrench and the determined grip quality, an acceleration for the robotic gripper.

In another aspect, selecting the acceleration for the robotic gripper includes selecting the acceleration for the robotic gripper based, at least in part, on a comparison of the determined grip quality and the measured aggregate wrench.

In another aspect, selecting the acceleration for the robotic gripper comprises increasing the acceleration for the robotic gripper when a ratio of the determined grip quality to the measured aggregate wrench is above a threshold.

In another aspect, selecting the acceleration for the robotic gripper comprises decreasing the acceleration of the robotic gripper when a ratio of the determined grip quality to the measured aggregate wrench is below a threshold.

In another aspect, measuring an aggregate wrench on the robotic gripper while moving the object comprises measuring an aggregate wrench on the robotic gripper while moving the object with a constant acceleration.

In another aspect, the method further comprises continuously varying an acceleration of the robotic gripper based, at least in part, on the grip quality between the robotic gripper and the object.

In another aspect, measuring an aggregate wrench on the robotic gripper comprises measuring the aggregate wrench using a sensor coupled to the robotic gripper, wherein the sensor comprises one or more selected from the group of a force sensor, a torque sensor, and a force/torque sensor.

In another aspect, the robotic gripper further comprises at least one processor, and determining the grip quality between the robotic gripper and the object is performed by the at least one processor.

In another aspect, the method further comprises determining that the two or more cup assemblies are within a threshold distance from the object, and applying the vacuum to the two or more cup assemblies when it is determined that the two or more cup assemblies are within the threshold distance.

In another aspect, determining that the two or more cup assemblies are within a threshold distance from the object comprises determining that the two or more cup assemblies are in contact with the object.

In another aspect, the robotic gripper comprises a distance sensor, and determining that the two or more cup assemblies are within a threshold distance from the object is based, at least in part, on an output of the distance sensor.

In another aspect, the distance sensor is a time-of-flight sensor.

In another aspect, moving the object includes lifting the object.

One aspect of the disclosure provides a robotic gripper. The robotic gripper comprises a plurality of individually controllable vacuum assemblies. Each of the vacuum assemblies comprises a vacuum valve configured to couple to a cup assembly.

In another aspect, each of the vacuum assemblies further comprises a control valve coupled to the vacuum valve and configured to actuate the vacuum valve.

In another aspect, each of the plurality of individually controllable vacuum assemblies further comprises a pressure sensor configured to sense a pressure level in the cup assembly.

In another aspect, the robotic gripper further comprises a controller configured to adjust an amount of vacuum supplied to one or more of the plurality of cup assemblies based, at least in part, on the sensed pressure levels in the plurality of cup assemblies In another aspect, the robotic gripper further comprises a vacuum source coupled to respective control valves of the plurality of individually controllable vacuum assemblies.

In another aspect, the respective vacuum valves of the plurality of individually controllable vacuum assemblies are poppet valves.

In another aspect, the respective control valves of the plurality of individually controllable vacuum assemblies are solenoid valves.

In another aspect, the robotic gripper further comprises a manifold coupled to each of the plurality of individually controllable vacuum assemblies.

In another aspect, the plurality of individually controllable vacuum assemblies are arranged in a configuration having a plurality of spatial zones, wherein each of the plurality of spatial zones includes at least two vacuum assemblies. The at least one controller is configured to control the control valves for respective vacuum assemblies in one or more of the spatial zones to simultaneously actuate respective vacuum valves.

In another aspect, the at least two vacuum assemblies in at least one of the plurality of spatial zones is associated with cup assemblies having different sizes.

In another aspect, at least two of the cup assemblies have different sizes.

One aspect of the disclosure provides a method of adjusting vacuum in a robotic gripper coupled to a gripped object, wherein the robotic gripper includes a plurality of vacuum-based cup assemblies. The method comprises determining a pressure level at a first point in time for at least some of the plurality of cup assemblies, adjusting an amount of vacuum supplied to one or more of the plurality of cup assemblies based, at least in part, on the determined pressure levels, and determining the pressure level at a second point in time after the first point in time for the at least some of the cup assemblies.

In another aspect, adjusting an amount of vacuum supplied to the one or more of the plurality of cup assemblies includes controlling a control valve coupled to a vacuum valve of each of the one or more of the plurality of cup assemblies to actuate the vacuum valve.

In another aspect determining the pressure level includes determining the pressure level using a corresponding pressure sensor associated with each of the at least some of the plurality of cup assemblies.

In another aspect, adjusting the amount of vacuum to the one or more of the plurality of cup assemblies based, at least in part, on the determined pressure levels includes adjusting the amount of vacuum supplied to the one or more of the plurality of cup assemblies based, at least in part, on whether the determined pressure levels are below a threshold value.

In another aspect, adjusting the amount of vacuum supplied to the one or more of the plurality of cup assemblies includes closing one or more valves associated with the one or more of the plurality of cup assemblies.

In another aspect, adjusting the amount of vacuum supplied to the one or more of the plurality of cup assemblies includes adjusting an amount of vacuum supplied to each of the one or more of the plurality of cup assemblies.

One aspect of the disclosure provides a method of selectively activating cup assemblies of a robotic gripper. The method comprises applying a pulse to the cup assemblies, determining a pulse response of each of the cup assemblies, and selectively activating one or more of the cup assemblies based, at least in part, on the determined pulse responses.

In another aspect, the method further comprises normalizing the pulse response of each of the cup assemblies.

In another aspect, determining the pulse response of each of the cup assemblies includes detecting a rate of change of a pressure signal of each of the cup assemblies.

In another aspect, determining the pulse response of each of the cup assemblies includes detecting a peak of a pressure signal of each of the cup assemblies.

In another aspect, selectively activating one or more of the cup assemblies based, at least in part, on the determined pulse responses includes selectively activating one or more of the cup assemblies based, at least in part, on a pulse response threshold.

In another aspect, selectively activating one or more of the cup assemblies based, at least in part, on the determined pulse responses includes sequentially activating cup assemblies until a target pressure drop is detected.

In another aspect, applying a pulse to the cup assemblies includes simultaneously activating the cup assemblies for a fixed time period.

It should be appreciated that all combinations of the foregoing concepts and additional concepts discussed in greater detail below (provided such concepts are not mutually inconsistent) are contemplated as being part of the inventive subject matter disclosed herein.

DESCRIPTION OF DRAWINGS

FIG. 2A illustrates a perspective view of an example of a robotic gripper.

DETAILED DESCRIPTION

Robots are typically configured to perform various tasks in an environment in which they are placed. Generally, these tasks include interacting with objects and/or the elements of the environment. To accomplish such tasks, some robots include one or more arms with end-effectors (e.g., a gripper) controlled to interact with objects in the environment. For instance, a gripper end-effector of a robot may be controlled to pick up objects (e.g., boxes) and arrange the picked up objects on a pallet for shipping, or alternatively, remove objects from a pallet for distribution as part of a logistics application. End-effectors may include multiple vacuum assemblies that attach to an object by applying a suction force through a suction cup. Typically, the individual vacuum assemblies are not individually addressable. Often, control valves are too large to be associated with individual vacuum assemblies. As such, each control valve may be associated with multiple cup assemblies, resulting in relatively large zones of the end-effector that may be turned on or off to tailor the performance of the gripper to a given application.

The inventors have recognized and appreciated that individually addressable vacuum assemblies may increase control and generally enhance the grasping capabilities of a robotic end-effector. Instead of controlling all vacuum assemblies of a robotic gripper at once, or even controlling discrete zones of vacuum assemblies, the ability to specify the performance of each vacuum assembly individually may enable improved grasping abilities. Additionally, the inventors have recognized and appreciated the benefits of being able to determine the quality of a grip that a robotic gripper exerts on a grasped object. Information about the grip quality may inform characteristics of path planning for the robotic gripper, such as end effector pose and/or acceleration. For example, if a grip quality between a robotic gripper and an object is determined to be high, the gripper may be able to accelerate more quickly and execute more dynamic maneuvers compared to a scenario in which a grip quality is determined to be low.

Example Robotic System

Figure 1A:
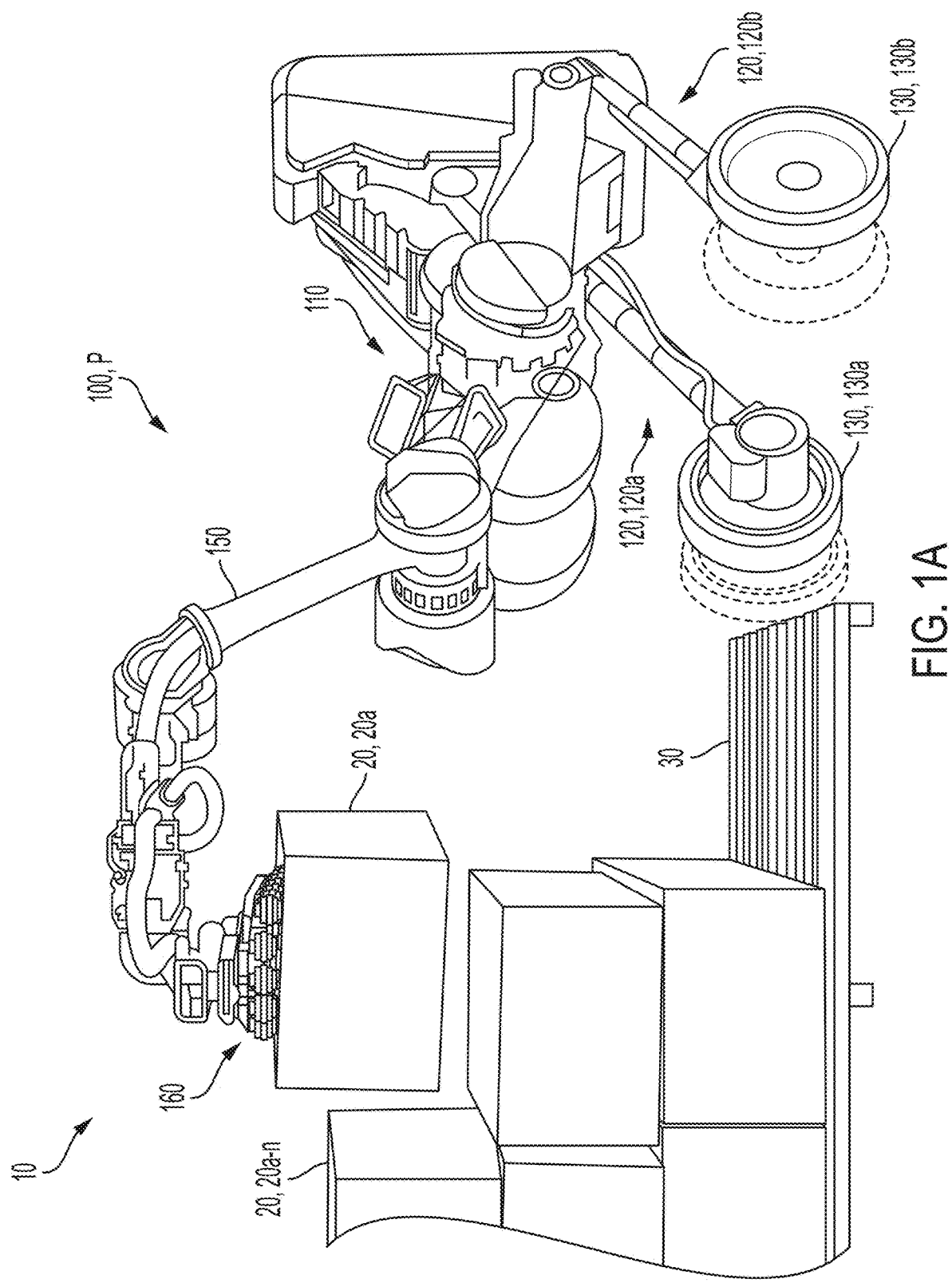
FIG. 1A is a perspective view of an example of a robot moving a box within an environment.

FIG. 1A depicts an example of a robot 100, within which generally includes a body 110, at least one leg 120 (e.g., shown as two legs 120, 120a-b), drive wheels 130 coupled to each leg 120, and an arm 150 with an end-effector 160. Although shown with wheels, it should be appreciated that a robot with a stationary base (e.g., without wheels) may also be used. The robot 100 is within an environment 10 that includes a plurality of boxes 20, 20a-n 25 stacked on a pallet 30. Here, using the end-effector 160, the robot 100 is moving a box 20a from a pallet 30. The end-effector 160 may be, for example, a gripper, and may include a force sensor, a torque sensor, or a force/torque sensor configured to measure the force and/or torque exerted on the robot by a load (e.g., box 20a) being moved by the gripper. In some embodiments, the end-effector 160 may be a vacuum-based gripper.

Figure 1B:
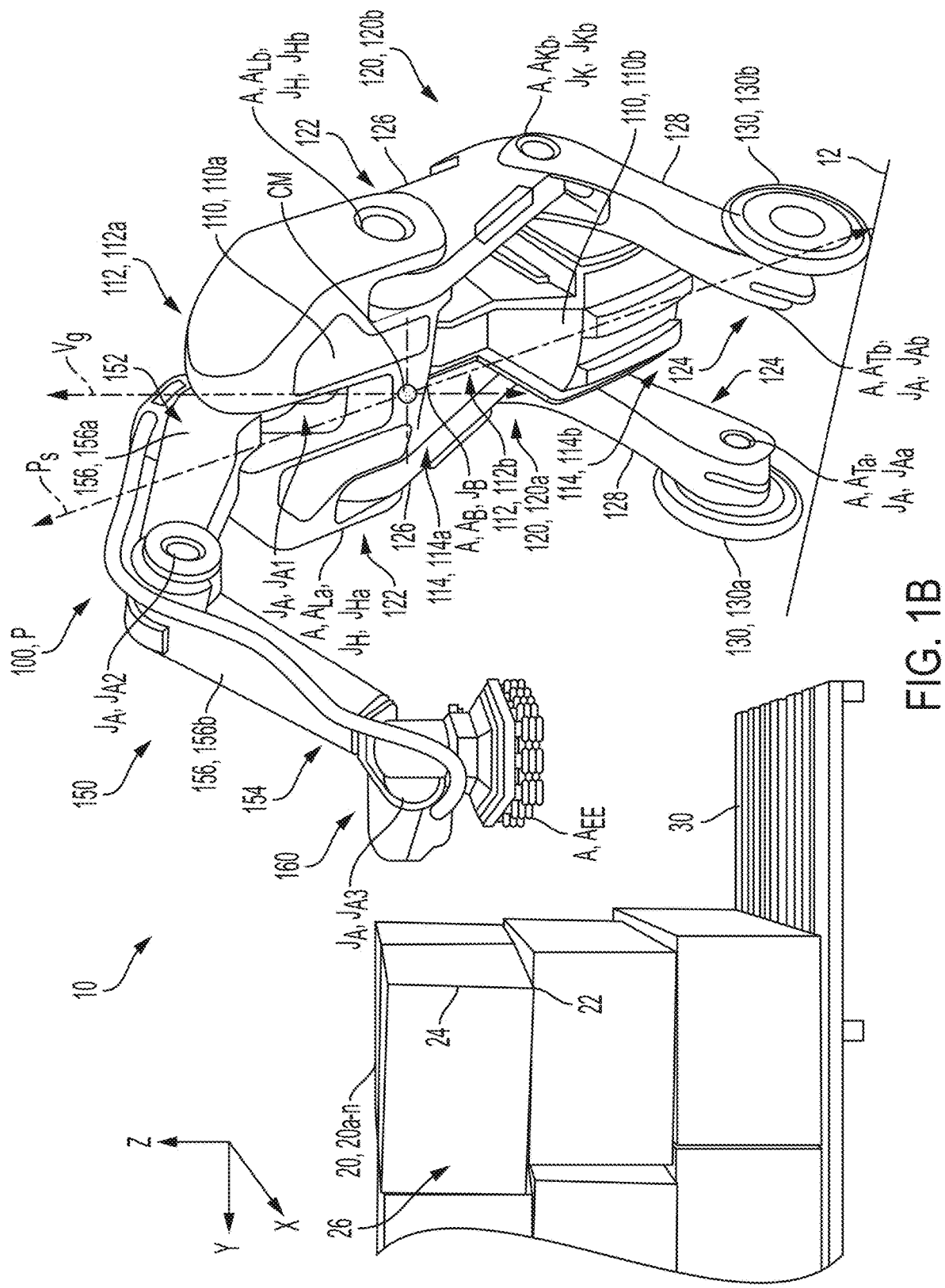
FIG. 1B is a perspective view of an example of the robot.

FIG. 1B is an example of a robot 100 operating within the environment 10 that includes at least one box 20. Here, the environment 10 includes a plurality of boxes 20, 20a-n stacked on a pallet 30 lying on a ground surface 12. The robot 100 may move (e.g., drive) across the ground surface 12 to detect and/or to manipulate boxes 20 within the environment 10. For example, the pallet 30 may correspond to a delivery truck that the robot 100 loads or unloads. Here, the robot 100 may be a logistics robot associated with a shipping and/or receiving stage of logistics. As a logistics robot, the robot 100 may palletize or detect boxes 20 for logistics fulfillment or inventory management. For instance, the robot 100 detects a box 20, processes the box 20 for incoming or outgoing inventory, and moves the box 20 about the environment 10.

The robot 100 has a vertical gravitational axis Vg along a direction of gravity, and a center of mass (COM), which is a point where the robot 100 has a zero sum distribution of mass. The robot 100 further has a pose P based on the COM relative to the vertical gravitational axis $V_g$ to define a particular attitude or stance assumed by the robot 100. The attitude of the robot 100 can be defined by an orientation or an angular position of an object in space.

The robot 100 generally includes a body 110 and one or more legs 120. The body 110 of the robot 100 may be a unitary structure or a more complex design depending on the tasks to be performed in the environment 10. The body 110 may allow the robot 100 to balance, to sense about the environment 10, to power the robot 100, to assist with tasks within the environment 10, or to support other components of the robot 100. In some examples, the robot 100 includes a two-part body 110. For example, the robot 100 includes an inverted pendulum body (IPB) 110, 110a (i.e., referred to as a torso 110a of the robot 100) and a counter-balance body (CBB) 110, 110b (i.e., referred to as a tail 110b of the robot 100) disposed on the IPB 110a.

The body 110 (e.g., the IPB 110a or the CBB 110b) has first end portion 112 and a second end portion 114. For instance, the IPB 110a has a first end portion 112a and a second end portion 114a while the CBB 110b has a first end portion 112b and a second end portion 114b. In some implementations, the CBB 110b is disposed on the second end portion 114a of the IPB 110a and configured to move relative to the IPB 110a. In some examples, the CBB 110b includes a battery that serves to power the robot 100. A back joint $J_B$ may rotatably couple the CBB 110b to the second end portion 114a of the IPB 110a to allow the CBB 110b to rotate relative to the IPB 110a. The back joint $J_B$ may be referred to as a pitch joint. In the example shown, the back joint $J_B$ supports the CBB 110b to allow the CBB 110b to move/pitch around a lateral axis (y-axis) that extends perpendicular to the gravitational vertical axis $V_g$ and a fore-aft axis (x-axis) of the robot 100. The fore-aft axis (x-axis) may denote a present direction of travel by the robot 100. Movement by the CBB 110b relative to the IPB 110a alters the pose P of the robot 100 by moving the COM of the robot 100 relative to the vertical gravitational axis $V_g$. A rotational actuator or back joint actuator A, $A_B$ (e.g., a tail actuator or counterbalance body actuator) may be positioned at or near the back joint $J_B$ for controlling movement by the CBB 110b (e.g., tail) about the lateral axis (y-axis). The rotational actuator $A_B$ may include an electric motor, electro-hydraulic servo, piezo-electric actuator, solenoid actuator, pneumatic actuator, or other actuator technology suitable for accurately effecting movement of the CBB 110b relative to the IPB 110a.

The rotational movement by the CBB 110b relative to the IPB 110a alters the pose P of the robot 100 for balancing and maintaining the robot 100 in an upright position. For instance, similar to rotation by a flywheel in a conventional inverted pendulum flywheel, rotation by the CBB 110b relative to the gravitational vertical axis $V_g$ generates/imparts the moment at the back joint $J_B$ to alter the pose P of the robot 100. By moving the CBB 110b relative to the IPB 110a to alter the pose P of the robot 100, the COM of the robot 100 moves relative to the gravitational vertical axis $V_g$ to balance and maintain the robot 100 in the upright position in scenarios when the robot 100 is moving and/or carrying a load. However, by contrast to the flywheel portion in the conventional inverted pendulum flywheel that has a mass centered at the moment point, the CBB 110b includes a corresponding mass that is offset from moment imparted at the back joint $J_B$ some configurations, a gyroscope disposed at the back joint $J_B$ could be used in lieu of the CBB 110b to spin and impart the moment (rotational force) for balancing and maintaining the robot 100 in the upright position.

CBB 110b may rotate (e.g., pitch) about the back joint $J_B$ in both the clockwise and counter-clockwise directions (e.g., about the y-axis in the "pitch direction") to create an oscillating (e.g., wagging) movement. Movement by the CBB 110b relative to IPB 110a between positions causes the COM of the robot 100 to shift (e.g., lower toward the ground surface 12 or higher away from the ground surface 12). The CBB 110b may oscillate between movements to create the wagging movement. The rotational velocity of the CBB 110b when moving relative to the IPB 110a may be constant or changing (accelerating or decelerating) depending upon how quickly the pose P of the robot 100 needs to be altered for dynamically balancing the robot 100.

The legs 120 are locomotion-based structures (e.g., legs and/or wheels) that are configured to move the robot 100 about the environment 10. The robot 100 may have any number of legs 120 (e.g., a quadruped with four legs, a biped with two legs, a hexapod with six legs, an arachnid-like robot with eight legs, no legs for a robot with a stationary base, etc.). Here, for simplicity, the robot 100 is generally shown and described with two legs 120, 120a-b.

As a two-legged robot 100, the robot includes a first leg 120, 120a and a second leg 120, 120b. In some examples, each leg 120 includes a first end 122 and a second end 124. The second end 124 corresponds to an end of the leg 120 that contacts or is adjacent to a member of the robot 100 contacting a surface (e.g., a ground surface) such that the robot 100 may traverse the environment 10. For example, the second end 124 corresponds to a foot of the robot 100 that moves according to a gait pattern. In some implementations, the robot 100 moves according to rolling motion such that the robot 100 includes a drive wheel 130. The drive wheel 130 may be in addition to or instead of a foot-like member of the robot 100. For example, the robot 100 is capable of moving according to ambulatory motion and/or rolling motion. Here, the robot 100 depicted in FIG. 1B illustrates the first end 122 coupled to the body 110 (e.g., at the IPB 110a) while the second end 124 is coupled to the drive wheel 130. By coupling the drive wheel 130 to the second end 124 of the leg 120, the drive wheel 130 may rotate about an axis of the coupling to move the robot 100 about the environment 10.

Hip joints $J_H$ on each side of body 110 (e.g., a first hip joint $J_H$, $J_{Ha}$ and a second hip joint $J_H$, $J_{Hb}$ symmetrical about a sagittal plane $P_S$ of the robot 100) may rotatably couple the first end 122 of a leg 120 to the second end portion 114 of the body 110 to allow at least a portion of the leg 120 to move/pitch around the lateral axis (y-axis) relative to the body 110. For instance, the first end 122 of the leg 120 (e.g., of the first leg 120a or the second leg 120b) couples to the second end portion 114a of the IPB 110a at the hip joint $J_H$ to allow at least a portion of the leg 120 to move/pitch around the lateral axis (y-axis) relative to the IPB 110a.

A leg actuator A, $A_L$ may be associated with each hip joint $J_H$ (e.g., a first leg actuator $A_L$, $A_{La}$ and a second leg actuator $A_L$, $A_{Lb}$). The leg actuator $A_L$ associated with the hip joint $J_H$ may cause an upper portion 126 of the leg 120 (e.g., the first leg 120a or the second leg 120b) to move/pitch around the lateral axis (y-axis) relative to the body 110 (e.g., the IPB 110a). In some configurations, each leg 120 includes the corresponding upper portion 126 and a corresponding lower portion 128. The upper portion 126 may extend from the hip joint $J_H$ at the first end 122 to a corresponding knee joint $J_K$ and the lower portion 128 may extend from the knee joint $J_K$ to the second end 124. A knee actuator A, $A_K$ associated with the knee joint $J_K$ may cause the lower portion 128 of the leg 120 to move/pitch about the lateral axis (y-axis) relative to the upper portion 126 of the leg 120.

Each leg 120 may include a corresponding ankle joint $J_A$ configured to rotatably couple the drive wheel 130 to the second end 124 of the leg 120. For example, the first leg 120a includes a first ankle joint $J_A$, $J_{Aa}$ and the second leg 120b includes a second ankle joint $J_A$, $J_{Ab}$. Here, the ankle joint $J_A$ may be associated with a wheel axle coupled for common rotation with the drive wheel 130 and extending substantially parallel to the lateral axis (y-axis). The drive wheel 130 may include a corresponding torque actuator (drive motor) A, $A_T$ configured to apply a corresponding axle torque for rotating the drive wheel 130 about the ankle joint $J_A$ to move the drive wheel 130 across the ground surface 12 along the fore-aft axis (x-axis). For instance, the axle torque may cause the drive wheel 130 to rotate in a first direction for moving the robot 100 in a forward direction along the fore-aft axis (x-axis) and/or cause the drive wheel 130 to rotate in an opposite second direction for moving the robot 100 in a rearward direction along the fore-aft axis (x-axis).

In some implementations, the legs 120 are prismatically coupled to the body 110 (e.g., the IPB 110a) such that a length of each leg 120 may expand and retract via a corresponding actuator (e.g., leg actuators $A_L$) proximate the hip joint $J_H$, a pair of pulleys (not shown) disclosed proximate the hip joint $J_H$ and the knee joint $J_K$ and a timing belt (not shown) synchronizing rotation of the pulleys. Each leg actuator $A_L$ may include a linear actuator or a rotational actuator. Here, a control system 140 with a controller 142 (e.g., shown in FIG. 1C) may actuate the actuator associated with each leg 120 to rotate the corresponding upper portion 126 relative to the body 110 (e.g., the IPB 110a) in one of a clockwise direction or a counter-clockwise direction to prismatically extend/expand the length of the leg 120 by causing the corresponding lower portion 128 to rotate about the corresponding knee joint $J_K$ relative to the upper portion 126 in the other one of the clockwise direction or the counter-clockwise direction. Optionally, instead of a two-link leg, the at least one leg 120 may include a single link that prismatically extends/retracts linearly such that the second end 124 of the leg 120 prismatically moves away/toward the body 110 (e.g., the IPB 110a) along a linear rail. In other configurations, the knee joint $J_K$ may employ a corresponding a rotational actuator as the knee actuator $A_K$ for rotating the lower portion 128 relative to the upper portion 126 in lieu of a pair of synchronized pulleys.

The corresponding axle torques applied to each of the drive wheels 130 (e.g., a first drive wheel 130, 130a associated with the first leg 120a and a second drive wheel 130, 130b associated with the second leg 120b) may vary to maneuver the robot 100 across the ground surface 12. For instance, an axle torque (i.e., a wheel torque τW) applied to the first drive wheel 130a that is greater than a wheel torque τW applied to the second drive wheel 130b may cause the robot 100 to turn to the left, while applying a greater wheel torque τW to the second drive wheel 130b than to the first drive wheel 130 may cause the robot 100 to turn to the right. Similarly, applying substantially the same magnitude of wheel torque τW to each of the drive wheels 130 may cause the robot 100 to move substantially straight across the ground surface 12 in either the forward or reverse directions. The magnitude of axle torque $T_A$ applied to each of the drive wheels 130 also controls velocity of the robot 100 along the fore-aft axis (x-axis). Optionally, the drive wheels 130 may rotate in opposite directions to allow the robot 100 to change orientation by swiveling on the ground surface 12. Thus, each wheel torque τW may be applied to the corresponding drive wheel 130 independent of the axle torque (if any) applied to the other drive wheel 130.

In some examples, the body 110 (e.g., at the CBB 110b) also includes at least one non-drive wheel (not shown). The non-drive wheel is generally passive (e.g., a passive caster wheel) and does not contact the ground surface 12 unless the body 110 moves to a pose P where the body 110 (e.g., the CBB 110b) is supported by the ground surface 12.

In some implementations, the robot 100 further includes one or more appendages, such as an articulated arm 150 (also referred to as an arm or a manipulator arm) disposed on the body 110 (e.g., on the IPB 110a) and configured to move relative to the body 110. The articulated arm 150 may have one or more degrees of freedom (e.g., ranging from relatively fixed to capable of performing a wide array of tasks in the environment 10). Here, the articulated arm 150 illustrated in FIG. 1B has five-degrees of freedom. While FIG. 1B shows the articulated arm 150 disposed on the first end portion 112 of the body 110 (e.g., at the IPB 110a), the articulated arm 150 may be disposed on any part of the body 110 in other configurations. For instance, the articulated arm 150 is disposed on the CBB 110b or on the second end portion 114a of the IPB 110a.

The articulated arm 150 extends between a proximal first end 152 and a distal second end 154. The arm 150 may include one or more arm joints $J_A$ between the first end 152 and the second end 154 where each arm joint $J_A$ is configured to enable the arm 150 to articulate in the environment 10. These arm joints $J_A$ may either couple an arm member 156 of the arm 150 to the body 110 or couple two or more arm members 156 together. For example, the first end 152 connects to the body 110 (e.g., the IPB 110a) at a first articulated arm joint $J_A$, $J_{A1}$ (e.g., resembling a shoulder joint). In some configurations, the first articulated arm joint $J_A$, $J_{A1}$ is disposed between the hip joints $J_H$ (e.g., aligned along the sagittal plane $P_S$ of the robot 100 at the center of the body 110). In some examples, the first articulated arm joint $J_A$, $J_{A1}$ rotatably couples the proximal first end 152 of the arm 150 to the body 110 (e.g., the IPB 110a) to enable the arm 150 to rotate relative to the body 110 (e.g., the IPB 110a). For instance, the arm 150 may move/pitch about the lateral axis (y-axis) relative to the body 110.

In some implementations, such as FIG. 1B, the arm 150 includes a second arm joint $J_A$, $J_{A2}$ (e.g., resembling an elbow joint) and a third arm joint $J_A$, $J_{A3}$ (e.g., resembling a wrist joint). The second arm joint $J_A$, $J_{A2}$ couples a first arm member 156a to a second arm member 156b such that these members 156a-b are rotatable relative to one another and also to the body 110 (e.g., the IPB 110). Depending on a length of the arm 150, the second end 154 of the arm 150 coincides with an end of an arm member 156. For instance, although the arm 150 may have any number of arm members 156, FIG. 1B depicts the arm 150 with two arm members 156a-b such that the end of the second arm member 156b coincides with the second end 154 of the arm 150. Here, at the second end 154 of the arm 150, the arm 150 includes an end-effector 160 that is configured to perform tasks within the environment 10. The end-effector 160 may be disposed on the second end 154 of the arm 150 at an arm joint $J_A$ (e.g., at the third arm joint $J_A$, $J_{A3}$) to allow the end-effector 160 to have multiple degrees of freedom during operation. The end-effector 160 may include one or more end-effector actuators A, $A_{EE}$ for gripping/grasping objects. For instance, the end-effector 160 includes one or more suction cups as end-effector actuators $A_{EE}$ to grasp or to grip objects by providing a vacuum seal between the end-effector 160 and a target object.

The articulated arm 150 may move/pitch about the lateral axis (y-axis) relative to the body 11.0 (e.g., the IPB 110a). For instance, the articulated arm 150 may rotate about the lateral axis (y-axis) relative to the body 110 in the direction of gravity to lower the COM of the robot 100 while executing turning maneuvers. The CBB 110b may also simultaneously rotate about the lateral axis (y-axis) relative to the IPB 110 in the direction of gravity to assist in lowering the COM of the robot 100. Here, the articulated arm 150 and the CBB 110b may cancel out any shifting in the COM of the robot 100 in the forward or rearward direction along the fore-aft axis (x-axis), while still effectuating the COM of the robot 100 to shift downward closer to the ground surface 12.

Figure 1C:
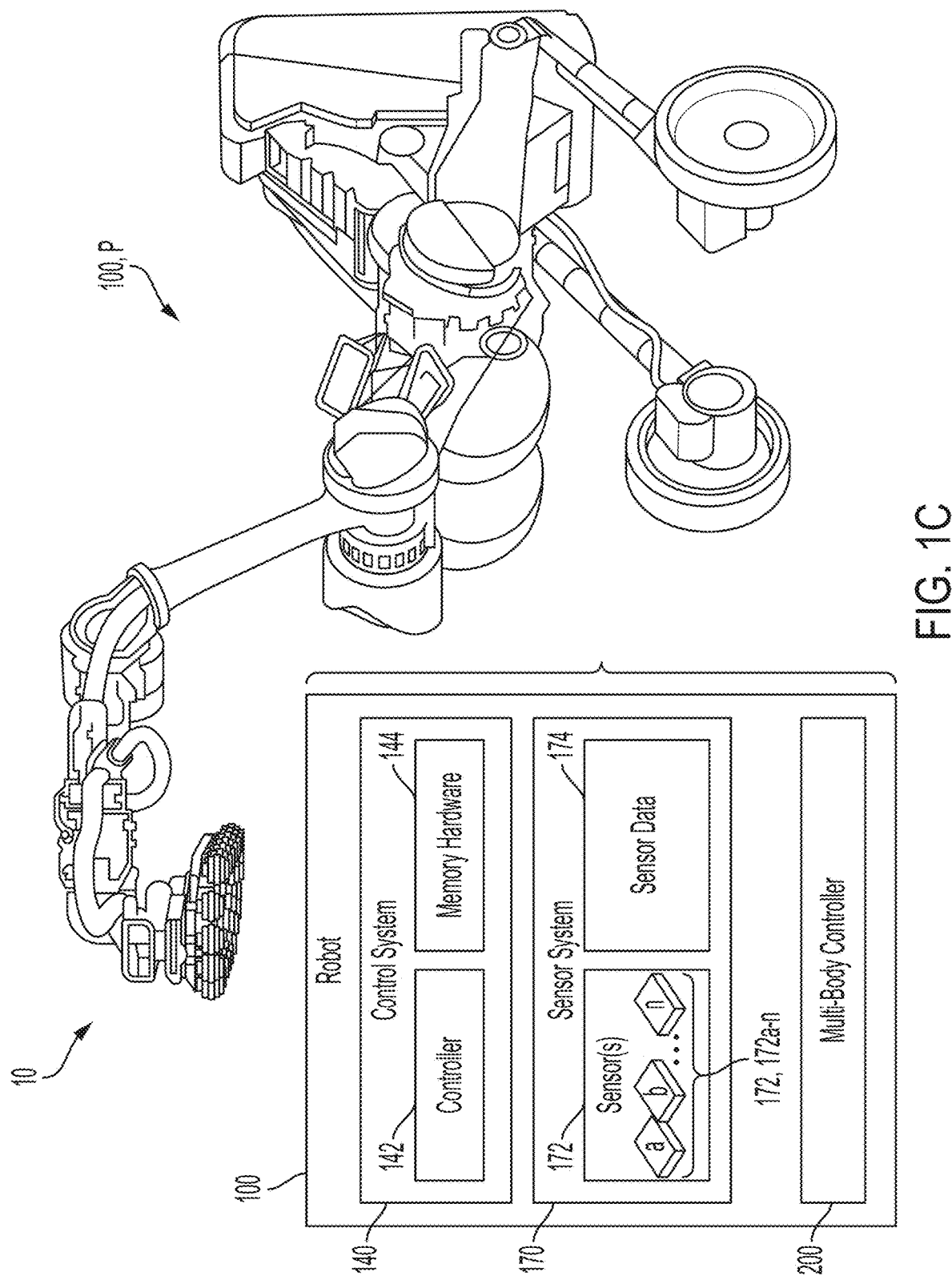
FIG. 1C is a schematic view of an example arrangement of system of a robot of FIG. 1B.

With reference to FIG. 1C, the robot 100 includes a control system 140 configured to monitor and to control operation of the robot 100. In some implementations, the robot 100 is configured to operate autonomously and/or semi-autonomously. However, a user may also operate the robot by providing commands/directions to the robot 100. In the example shown, the control system 140 includes a controller 142 (e.g., data processing hardware) and memory hardware 144. The controller 142 may include its own memory hardware or utilize the memory hardware 144 of the control system 140. In some examples, the control system 140 (e.g., with the controller 142) is configured to communicate (e.g., command motion) with the actuators A back actuator(s) $A_B$, leg actuator(s) $A_L$, knee actuator(s) $A_K$, drive belt actuator(s), rotational actuator(s), end-effector actuator(s) $A_{EE}$, etc.) to enable the robot 100 to move about the environment 10. The control system 140 is not limited to the components shown, and may include additional (e.g., a power source) or less components without departing from the scope of the present disclosure. The components may communicate by wireless or wired connections and may be distributed across multiple locations of the robot 100. In sonic configurations, the control system 140 interfaces with a remote computing device and/or a user. For instance, the control system 140 may include various components for communicating with the robot 100, such as a joystick, buttons, transmitters/receivers, wired communication ports, and/or wireless communication ports for receiving inputs from the remote computing device and/or user, and providing feedback to the remote computing device and/or user.

The controller 142 corresponds to data processing hardware that may include one or more general purpose processors, digital signal processors, and/or application specific integrated circuits (ASICs). In some implementations, the controller 142 is a purpose-built embedded device configured to perform specific operations with one or more subsystems of the robot 100. Additionally or alternatively, the controller 142 includes a software application programmed to execute functions for systems for the robot 100 using the data processing hardware of the controller 142. The memory hardware 144 is in communication with the controller 142 and may include one or more non-transitory computer-readable storage media such as volatile and/or non-volatile storage components. For instance, the memory hardware 144 may be associated with one or more physical devices in communication with one another and may include optical, magnetic, organic, or other types of memory or storage. The memory hardware 144 is configured to, inter alia, store instructions (e.g., computer-readable program instructions) that, when executed by the controller 142, cause the controller 142 to perform numerous operations, such as, without limitation, altering the pose P of the robot 100 for maintaining balance, maneuvering the robot 100, detecting objects, transporting objects, and/or performing other tasks within the environment 10. In some implementations, the controller 142 performs the operations based on direct or indirect interactions with a sensor system 170.

The sensor system 170 includes one or more sensors 172, 172a-n. The sensors 172 may include vision/image sensors, inertial sensors (e.g., an inertial measurement unit (IMU)), and/or kinematic sensors. Some examples of one or more sensors 172 include a camera such as a monocular camera or a stereo camera, a time of flight (TOF) depth sensor, a scanning light-detection and ranging (LIDAR) sensor, or a scanning laser-detection and ranging (LADAR) sensor.

More generically, the sensor(s) 172 may include one or more of force sensors, torque sensors, velocity sensors, acceleration sensors, position sensors (linear and/or rotational position sensors), motion sensors, location sensors, load sensors, temperature sensors, pressure sensors (e.g., for monitoring the end-effector actuator $A_{EE}$), touch sensors, depth sensors, ultrasonic range sensors, infrared sensors, and/or object sensors. In some examples, sensor(s) 172 have a corresponding field(s) of view defining a sensing range or region corresponding to sensor(s) 172. Each sensor 172 may be pivotable and/or rotatable such that the sensor 172 may, for example, change the field of view about one or more axes (e.g., an x-axis, a y-axis, or a z-axis in relation to a ground surface 12). In some implementations, the body 110 of the robot 100 includes a sensor system 170 with multiple sensors 172 about the body to gather sensor data 174 in all directions around the robot 100. Additionally or alternatively, sensor(s) 172 of the sensor system 170 may be mounted on the arm 150 of the robot 100 (e.g., in conjunction with one or more sensors 172 mounted on the body 110). The robot 100 may include any number of sensors 172 as part of the sensor system 170 in order to generate sensor data 174 for the environment 10 about the robot 100. For instance, when the robot 100 is maneuvering about the environment 10, the sensor system 170 gathers pose data for the robot 100 that includes inertial measurement data (e.g., measured by an IMU). In some examples, the pose data includes kinematic data and/or orientation data about the robot 100.

When surveying a field of view with a sensor 172, the sensor system 170 generates sensor data 174 (also referred to as image data 174) corresponding to the field of view. Sensor data 174 gathered by the sensor system 170, such as the image data, pose data, inertial data, kinematic data, etc., relating to the environment 10 may be communicated to the control system 140 (e.g., the controller 142 and/or memory hardware 144) of the robot 100. In some examples, the sensor system 170 gathers and stores the sensor data 174 (e.g., in the memory hardware 144 or memory hardware related to remote resources communicating with the robot 100). In other examples, the sensor system 170 gathers the sensor data 174 in real-time and processes the sensor data 174 without storing raw (i.e., unprocessed) sensor data 174. In yet other examples, the controller system 140 and/or remote resources store both the processed sensor data 174 and raw sensor data 174. The sensor data 174 from the sensor(s) 172 may allow systems of the robot 100 to detect and/or to analyze conditions about the robot 100. For instance, the sensor data 174 may allow the control system 140 to maneuver the robot 100, alter a pose P of the robot 100, and/or actuate various actuators A for moving/rotating mechanical components of the robot 100 (e.g., about joints J of the robot 100).

Example Gripper

In some embodiments, the end-effector 160 may be a vacuum-based gripper, which may include multiple individually addressable vacuum assemblies as end effector actuators $A_{EE}$. In other embodiments, an end effector 160 may be a mechanical gripper, a jamming based gripper, or any other suitable end effector, as the disclosure is not limited in this regard.

Figure 2B:
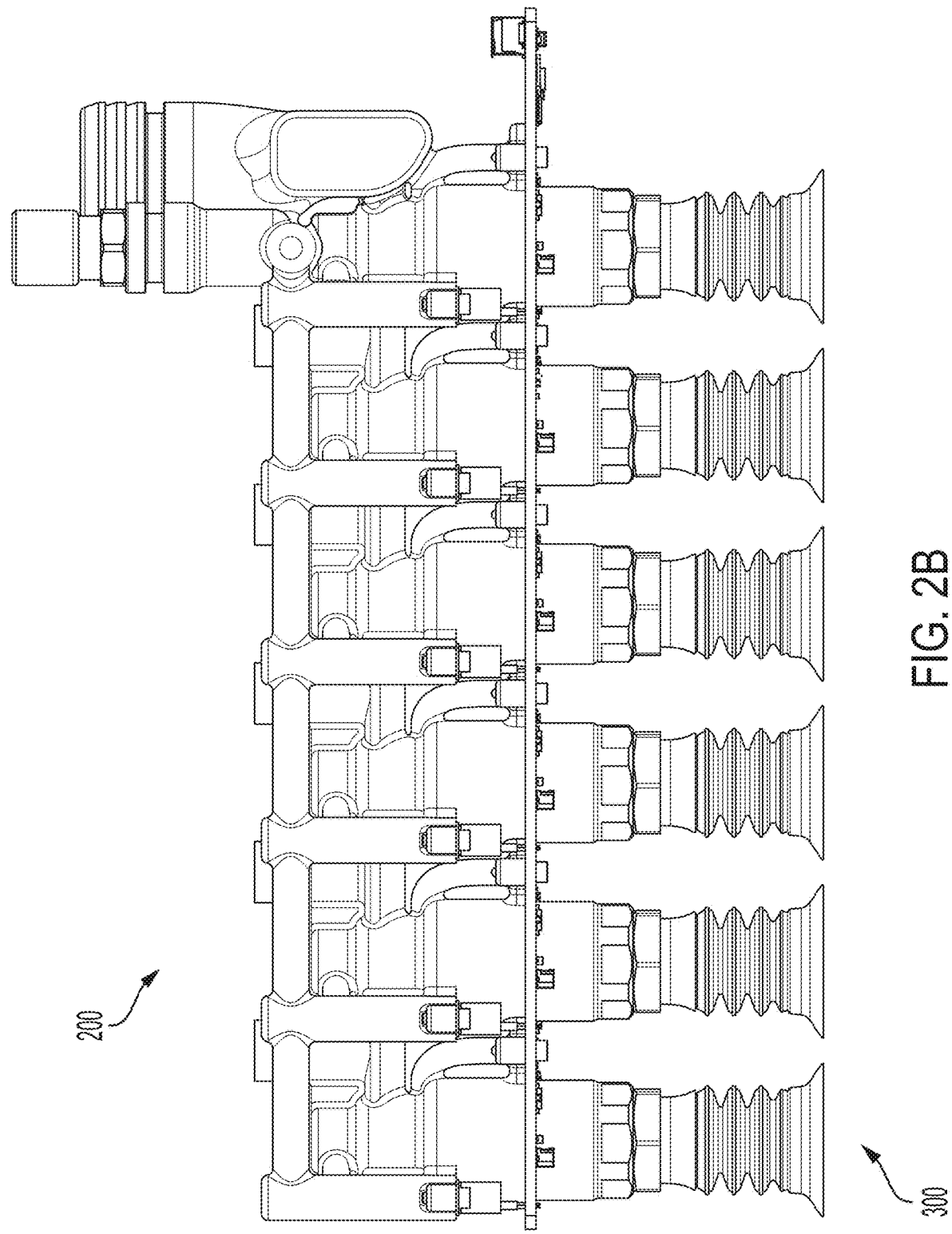
FIG. 2B illustrates a side view of an example of a robotic gripper.
Figure 2C:
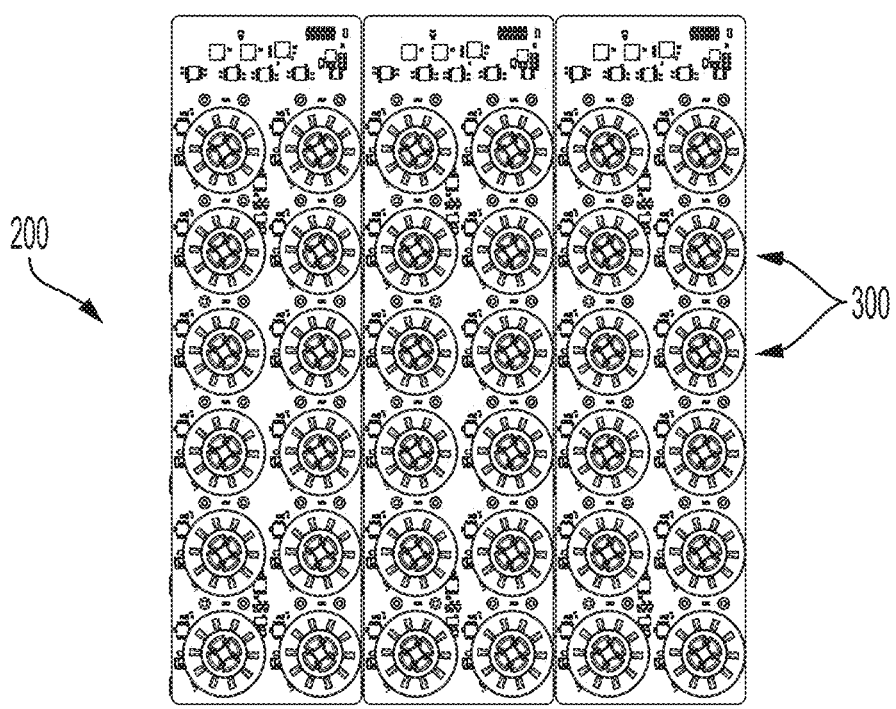
FIG. 2C illustrates a bottom view of an example of a robotic gripper.

FIG. 2A illustrates a perspective view of an example of a robotic gripper 200. FIG. 2B illustrates a side view, and FIG. 2C illustrates a bottom view. As shown, robotic gripper 200 is a vacuum-based gripper that includes a plurality of vacuum assemblies 300 arranged in an array and/or coupled to a manifold. In some embodiments, the vacuum assemblies 300 of robotic gripper 200 may be arranged in a rectilinear grid pattern, such as shown in FIG. 2A. However, it should be understood that any suitable arrangement of vacuum assemblies may be used, as the disclosure is not limited in this regard.

Figure 2D:
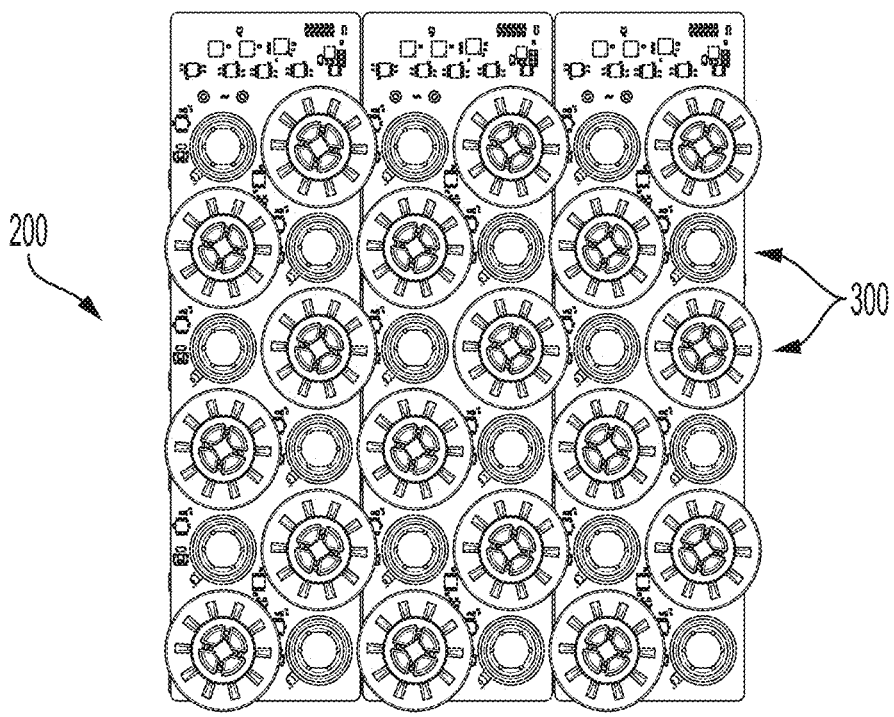
FIG. 2D illustrates a bottom view of another example of a robotic gripper.

In some embodiments, the vacuum assemblies 300 of a robotic gripper 200 may be uniform (e.g., have the same cross-sectional area, shape and/or material). In other embodiments, a robotic gripper may include a variety of different vacuum assemblies 300 (e.g., having different cross-sectional areas, shapes, and/or materials). For example, FIG. 2D illustrates a bottom view of another example of a robotic gripper that includes vacuum assemblies having different cross-sectional areas. Vacuum assemblies may be distinguished, in some embodiments, based on characteristics of the suction cups. For example, different vacuum assemblies may employ suction cups of different sizes or different materials.

A robotic gripper 200 may include a manifold that couples the vacuum assemblies 300. In some embodiments, a manifold may include a vacuum connection 202 and a high-pressure pneumatic connection 204. The vacuum connection may be configured to connect to a vacuum pump or any other suitable source of vacuum. Similarly, the high-pressure pneumatic connection may be configured to connect to a high-pressure pneumatic source, such as an air compressor. The manifold may be configured to distribute the vacuum and high-pressure air from their respective sources to each of the vacuum assemblies 300. In some embodiments, some vacuum assemblies may have a first type of suction cup, whereas other vacuum assemblies may have a second type of suction cup. For instance, suction cups may be distinguished based on size, shape, material, or any other appropriate characteristic. Some robotic grippers may include vacuum. assemblies without any suction cups in order to accommodate larger suction cups on neighboring vacuum assemblies. In some embodiments of a robotic gripper, different suction cups may be used in different spatial zones of the gripper, enabling zones that may be specialized for a particular task, such as gripping a particular material. In some embodiments, different types of suction cups may be dispersed throughout the robotic gripper. It should be appreciated that different types of suction cups, or any other component of a vacuum assembly, may be arranged in any configuration within a robotic gripper, as the disclosure is not limited in this regard.

In some embodiments, such as in embodiments in which the vacuum assemblies are individually addressable, a controller may be configured to control the operation of vacuum assemblies within one or more zones based on any relevant parameter. In some embodiments, zones of vacuum assemblies may be actuated based on a position relative to the robotic gripper. For example, a robotic gripper may have four individually addressable zones, corresponding to four quadrants of a rectilinear array. In some embodiments, zones of vacuum assemblies may be actuated based on suction cup type. For example, a robotic gripper may have two individually addressable zones, each corresponding to suction cups of a particular size and/or material. The two types of suction cups may be evenly distributed throughout the robotic gripper, may be confined to designated areas, or may be arranged in any other suitable configuration. Zones may be actuated in any desired order. Zones may be actuated sequentially, or simultaneously.

Figure 3:
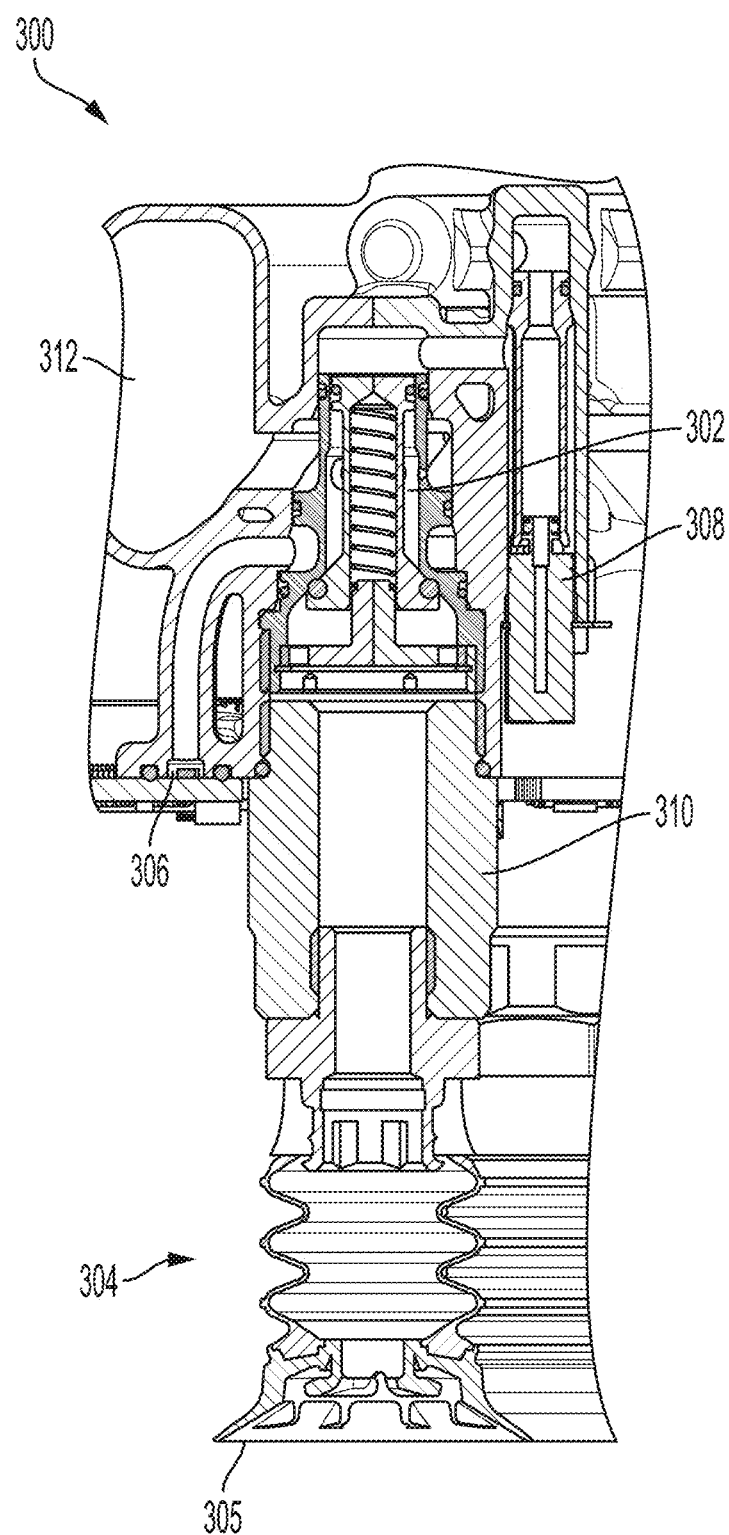
FIG. 3 illustrates an example of an individually controllable vacuum assembly.
Figure 4:
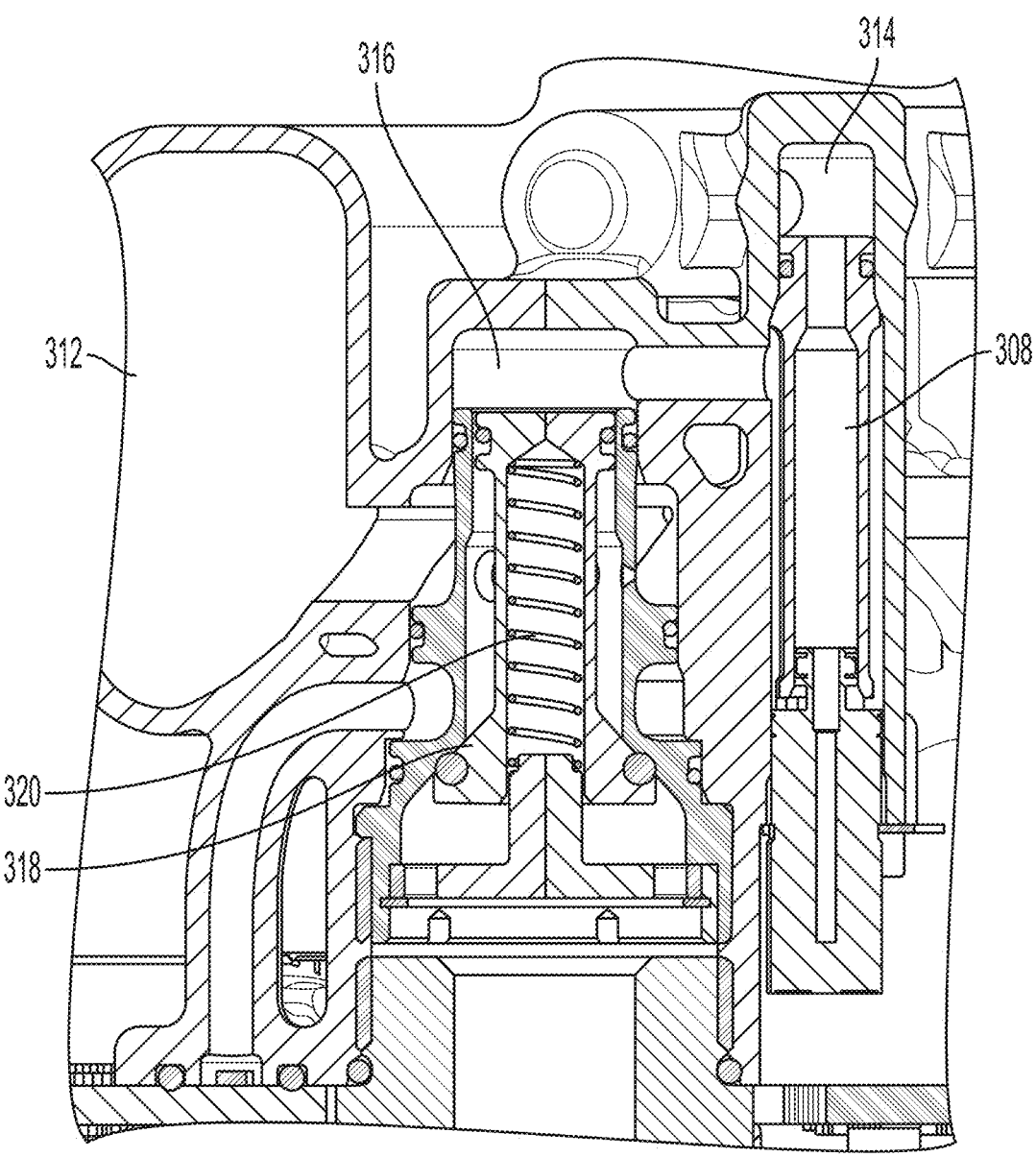
FIG. 4 illustrates an enlarged portion of the vacuum assembly of FIG. 3.

FIG. 3 illustrates one example of an individually controllable vacuum assembly 300. FIG. 4 illustrates a portion of the vacuum assembly 300 of FIG. 3 in greater detail. A vacuum assembly 300 may include a vacuum valve 302 configured to couple to a cup assembly 304. Cup assembly 304 may include suction cup 305. In some embodiments, a vacuum valve 302 may be coupled to a cup assembly 304 through a suction cup adaptor 310. In some embodiments, a vacuum valve may be a poppet valve. For example, a vacuum valve may be a piloted two stage poppet valve. However, other types of vacuum valves are contemplated, and the disclosure is not limited in this regard. For example, in some embodiments, a vacuum valve may be a direct drive valve.

In some embodiments, a control valve 308 may be coupled to the vacuum valve 302 and may be configured to actuate the vacuum valve. Actuating the control valve 308 may open a connection between the cup assembly 304 and a vacuum source 312 through the vacuum valve 302, enabling the suction cup 305 to apply a suction force and attach to a surface. The vacuum source 312 may be coupled to both the vacuum valve 302 and the control valve 308. In some embodiments, control valve 308 may be a solenoid valve. For example, control valve 308 may be a 3-way solenoid valve that, in one configuration, connects a high-pressure pneumatic input 314 to an output of the valve that is coupled to a pilot 316 of the vacuum valve 302. Applying a high-pressure to the vacuum valve pilot 316 may displace a plunger 318, establishing a connection between a vacuum source 312 and a cup assembly 304. When high-pressure is removed from the vacuum valve pilot 316, a return spring 320 may return the plunger 318 to its former position, closing the connection between the vacuum source 312 and the cup assembly 304. Other types of control valves are contemplated, and the disclosure is not limited in this regard. However, it should be appreciated that, in some embodiments, a vacuum valve may not be coupled to a control valve. For example, a direct drive vacuum valve may be used in place of a piloted vacuum valve.

In some embodiments, a vacuum assembly 300 may include a pressure sensor 306, which may be configured to sense a pressure level in the cup assembly 304. The pressure sensor 306 may be used in a feedback control method to selectively open or close a vacuum valve based, at least in part, on the sensed pressure within the cup assembly 304. in some embodiments, one or more of the vacuum assemblies 300 may not include a pressure sensor. In such embodiments, control valves may be configured to activate based on a different input. For example, the control valves may be activated based on a timing schedule. However, other suitable inputs to activate a control valve are contemplated, and the disclosure is not limited in this regard.

In some embodiments, individual control of each of a plurality of vacuum assemblies in a robotic gripper may be provided. The method may include sensing a pressure level in a cup assembly coupled to a vacuum valve of the vacuum assembly, and controlling a control valve coupled to the vacuum valve to actuate the vacuum valve based, at least in part, on the sensed pressure level.

The inventors have recognized and appreciated that the strength of grip between a vacuum-based gripper and an object may be improved if cup assemblies that have a good seal between the suction cup and the object are provided with more vacuum and cup assemblies that have a poor seal between the suction cup and the object are supplied with less (or no) vacuum.

Figure 5:
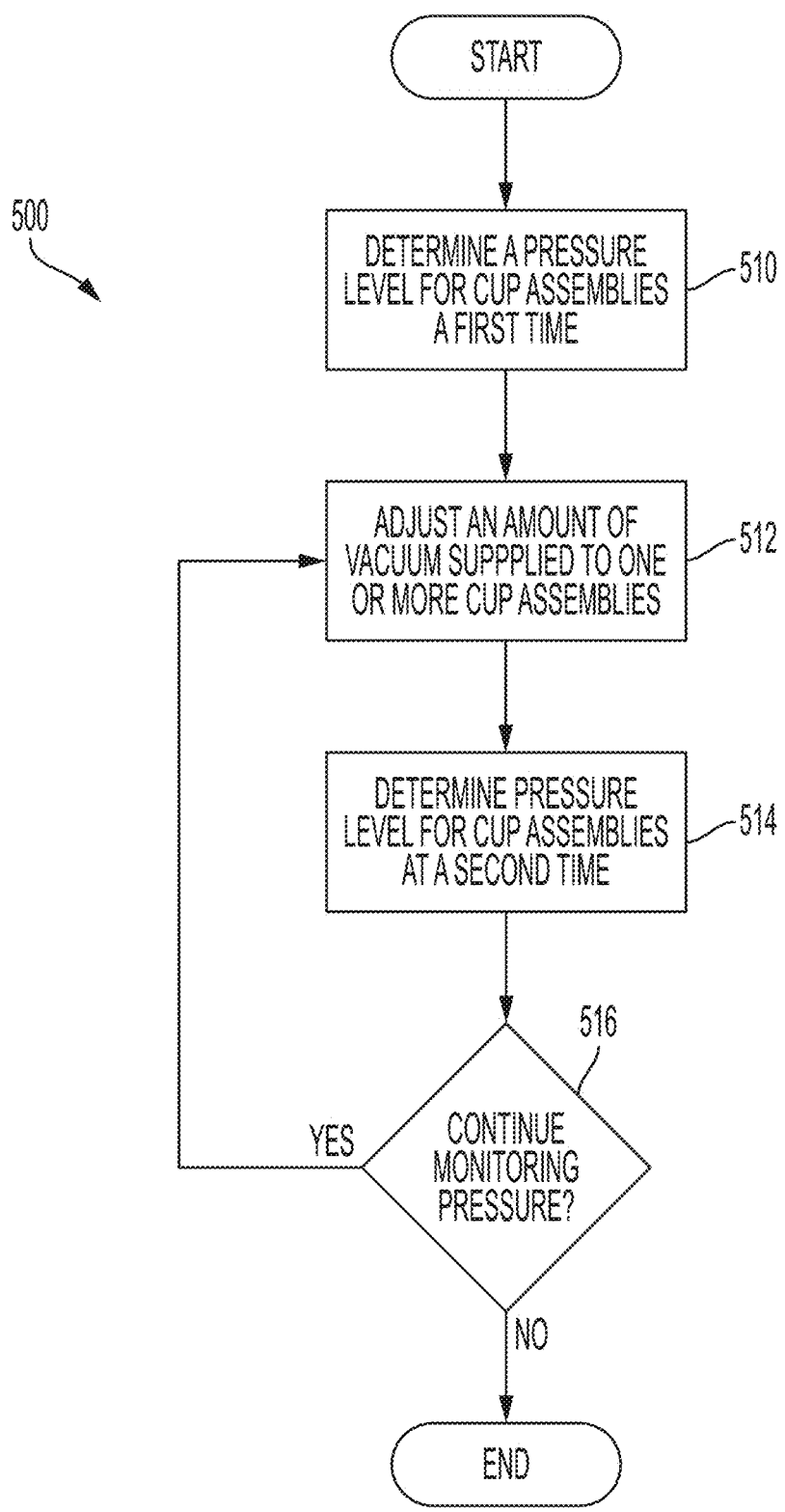
FIG. 5 illustrates an example of a process for adjusting an amount of vacuum supplied to individual cup assemblies in a robotic gripper.

FIG. 5 illustrates a process 500 for adjusting an amount of vacuum supplied to individual cup assemblies based, at least in part, on pressure measurements within the cup assemblies. In some embodiments, feedback provided by continuous or periodic pressure measurements are used to adjust the amount of vacuum supplied to individually addressable cup assemblies to improve or optimize grip of an object.

Process 500 begins in act 510, where a pressure level is determined at a first time for at least some cup assemblies of a plurality of cup assemblies within a robotic gripper. In some embodiments, the pressure level in a cup assembly is measured using a corresponding pressure sensor associated with the cup assembly. In other embodiments, a single pressure sensor may be shared among multiple cup assemblies.

Process 500 then proceeds to act 512, where an amount of vacuum supplied to one or more of the cup assemblies is adjusted based, at least in part, on the determined pressure level. For example, if a determined pressure level is below a threshold value and/or outside of a particular pressure range, it may be determined that the seal between the cup assembly and the object is poor and amount of vacuum supplied to that cup assembly should be reduced. In some embodiments, determining whether to supply vacuum to a particular cup assembly may be a binary decision in that vacuum is either supplied or not, for instance, by closing a valve for the cup assembly. In other embodiments, the vacuum supplied to particular cup assemblies can be reduced without completely turning off vacuum to the particular cup assemblies. It should be appreciated that the amount of vacuum supplied to particular cup assemblies may be adjusted either discretely or continuously, as the disclosure is not limited in this regard.

Process 500 then proceeds to act 514, where the pressure level for at least some of the cup assemblies is determined at a second time after the first time. Process 500 then proceeds to act 516 where it is determined whether to continue monitoring pressure in the cup assemblies. If it is determined in act 516 to continue monitoring pressure, process 500 returns to act 512, where the amount of vacuum supplied to one or more of the cup assemblies is adjusted based, at least in part, on the pressure level(s) determined at the second time in act 514. If it is determined in act 516 that pressure should no longer be monitored, process 500 ends.

In this way, pressure within individual cup assemblies of a robotic gripper can be determined when the robotic gripper first comes into contact with an object and corresponding vacuum supplied to one or more of the cup assemblies may be adjusted based on the sensed pressure to improve a grip between the robotic gripper and the object. Additionally, the pressure can be continuously and/or periodically monitored as the gripper is in contact with the object and adjustments to the supplied vacuum can be made to maintain an improved grip on the object, for instance, as a robot on which the gripper is used moves the object from one location to another location.

In some embodiments, a method of adjusting vacuum in a robotic gripper coupled to a gripped object may include first determining a pressure level for at least some of the cup assemblies. After the pressure level is determined, the amount of vacuum supplied to the cup assemblies may be adjusted based, at least in part, on the determined pressure level. After the amount of vacuum is adjusted, the pressure for at least some of the cup assemblies may again be determined. In this way, the method may be repeated in a cyclical manner. That is, the amount of vacuum supplied to the cup assemblies may be controlled based on feedback from pressure readings of the cup assemblies.

In some embodiments, the amount of vacuum supplied to the cup assemblies may be adjusted by modulating (e.g., opening or closing) a valve associated with a cup assembly.

The vacuum supplied to a cup assembly may be controlled in a discrete manner, in which a given cup assembly is either "on" or "off", or in a continuous manner, in which the vacuum supplied to a given cup assembly may be varied smoothly between a predetermined minimum value and a predetermined maximum value.

Any suitable stimulus or input may be used to trigger a controller to adjust the amount of vacuum supplied to a cup assembly. In some embodiments, the amount of vacuum may be adjusted based on the sensed pressure within a cup assembly. If the pressure with a cup assembly is determined to be outside of a specified range, the amount of vacuum supplied to that cup assembly may be adjusted. For example, the pressure of each cup assembly of an array of cup assemblies in a robotic gripper may be monitored to determine when a particular cup assembly loses (or fails to establish) adequate suction on a grasped object. Any cup assembly determined to be poorly sealed (or not sealed) on the object may be shut off, thereby increasing the suction force from the other cup assemblies in the array, and improving the grasp on the object. An amount of vacuum supplied to a cup assembly may be adjusted in any appropriate manner, such as by opening or closing an associated valve. The vacuum supplied to a cup assembly may be adjusted if the pressure level for a particular cup assembly is determined to be either above or below a particular threshold value.

Figure 6:
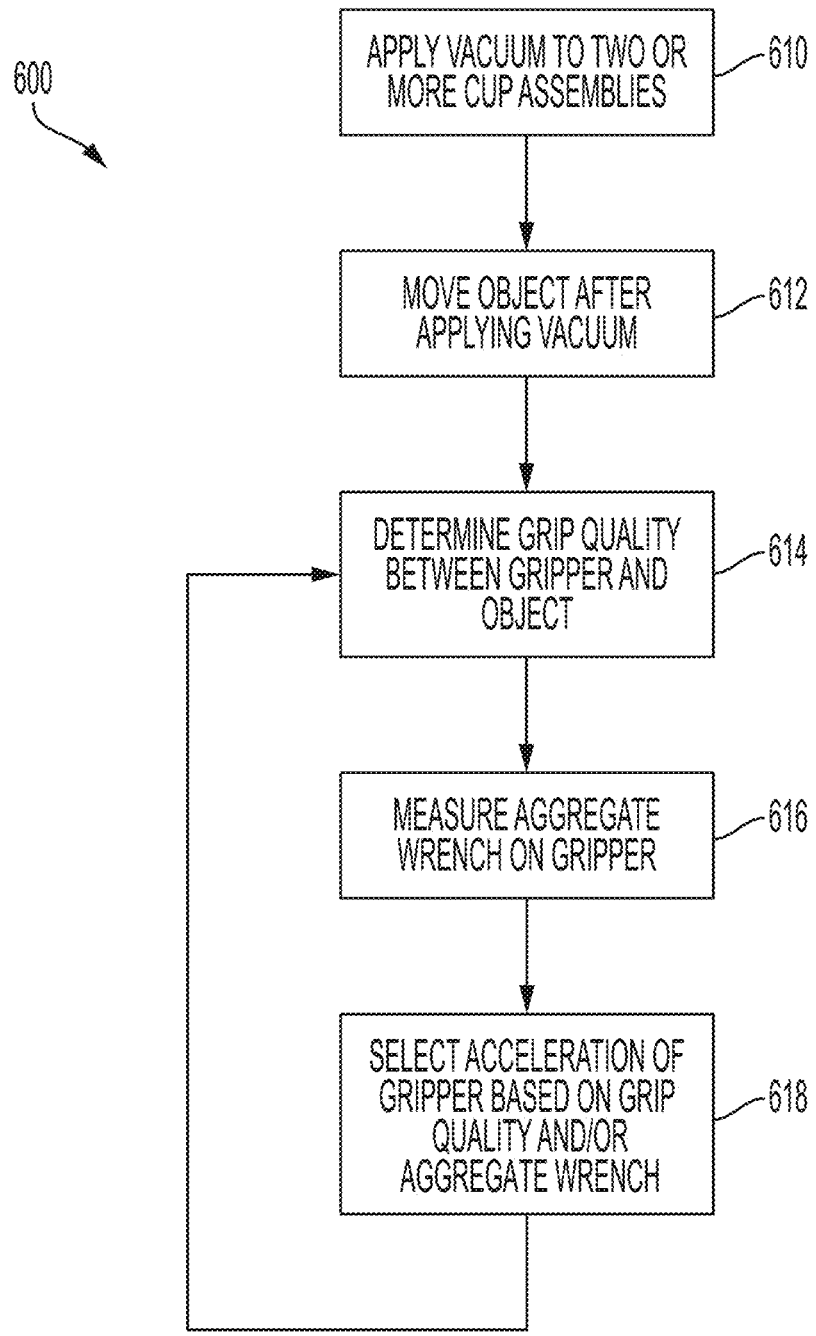
FIG. 6 illustrates an example of a process for determining a grip quality between a vacuum-based gripper and an object.

FIG. 6 illustrates a process 600 for determining a grip quality between a vacuum-based gripper and an object in accordance with some embodiments. In act 610, vacuum is applied to two or more cup assemblies of a plurality of cup assemblies of a robotic gripper. Process 600 then proceeds to act 612 where an object is moved by the robotic gripper after the vacuum has been applied to the two or more cup assemblies. It should be appreciated that the vacuum-based gripper may be configured to attach to any surface of the object to move the object. For instance, the vacuum-based gripper may be configured to attach to a top surface of the object or a side surface of the object to move the object. The surface of the object on which the gripper may be configured to attach may be determined based, at least in part, on a location and/or orientation of the object, movement constraints of the robot to which the gripper is attached, and/or environmental information within which the object is placed. For instance, objects on the top of a stack of objects may be gripped on a side surface for removal from the stack whereas objects lower in the stack may be gripped on a top surface. In some embodiments, moving an object may include lifting an object. In some embodiments the amount and/or configuration of vacuum applied to the cup assemblies of the robotic gripper may depend, at least in part, on the surface of the object on which the gripper is attached. Process 600 then proceeds to act 614 where a grip quality between the robotic gripper and the moved object is determined. In some embodiments, grip quality is determined based, at least in part, on a measurement from at least one pressure sensor associated with each of the two or more cup assemblies to which vacuum is applied. Process 600 then proceeds to act 616 where an aggregate wrench on the gripper as applied by the gripped object while moved is determined. As used herein, the term "wrench" is to be understood as referring to a generalized force that includes a combination of one or more forces or torques. It should be appreciated that a wrench may include only forces, only torques, or a combination of forces and torques. For example, "determining an aggregate wrench on the gripper" may be understood as "determining an aggregate force and/or torque on the gripper". For instance, the aggregate wrench may be determined using at least one force sensor, torque sensor, or force/torque sensor coupled to the gripper. In some embodiments, some parameters relating to the aggregate wrench on the gripper may be already known, such that sensing may not be required. For example, certain properties of the gripped object (mass, inertia, etc.) may be known before the object is gripped, and therefore may not need to be measured. Process 600 then proceeds to act 618 where an acceleration of the robotic gripper is selected based, at least in part, on the grip quality and/or the aggregate wrench. If desired, process 600 may return to act 614 where grip quality and aggregate wrench are determined to provide a continuous feedback loop which enables the robotic gripper to operate at an acceleration that corresponds to a desired safety factor.

The inventors have recognized and appreciated that it may be advantageous to increase the acceleration of the robotic gripper and/or the robot to which the robotic gripper is attached when a grip quality on an object is good and/or when the determined aggregate wrench is small. For instance, when the object is light and the grip is good, the robotic gripper can be operated with more speed. By contrast, when the object is poorly gripped by the gripper and/or the object is heavy, it may be advantageous to operate the robotic gripper with less speed to prevent the object from falling and/or to improve safety.

In one embodiment, a method of determining grip quality between a robotic gripper and an object may include first applying a vacuum to two or more cup assemblies of the robotic gripper in contact with the object. After the vacuum is applied and a grip is secured, the object may be moved with the robotic gripper. Then, using at least one pressure sensor associated with each of the two or more cup assemblies, a grip quality between the robotic gripper and the object may be determined. The grip quality may be used to select an acceleration for the robotic gripper.

In some embodiments, an aggregate wrench exerted on the robotic gripper by the objected may be measured while the gripper moves the object. For example, a force sensor, torque sensor, or force/torque sensor disposed between the end effector and the rest of the robotic arm may be used to determine the aggregate wrench. Of course, other methods of measuring forces and/or torques may be suitable, and the disclosure is not limited in this regard. In some situations, the aggregate wrench exerted on the robotic gripper may be used to determine the weight of the object. For example, the weight of the object may be determined if the robotic gripper moves the object with constant acceleration. Information regarding the aggregate wrench acting on the robotic gripper and/or the weight of the object may be used to select an acceleration for the robotic gripper.

In some embodiments, information regarding the aggregate wrench acting on the robotic gripper and/or the weight of the object may be used in conjunction with the determined grip quality to select an acceleration for the robotic gripper. A comparison of the determined grip quality and the measured aggregate wrench may help determine a ratio of the determined grip quality to the measured aggregate wrench. An acceleration for a robotic gripper may be adjusted based on the ratio of the determined grip quality to the measured aggregate wrench. In some embodiments, the acceleration may be increased when the ratio of the determined grip quality to the measured aggregate wrench is above a threshold value. For example, if the ratio is determined to be greater than 3, the gripper may be able to accelerate the object to an acceleration of up to 3 G (where G is the acceleration due to gravity) before the grip becomes compromised. In some embodiments, the acceleration may be decreased when the ratio of the determined grip quality to the measured aggregate wrench is below a threshold value. For example, if a suction cup loses suction as a robotic arm moves through a trajectory, the grip quality may be reduced and the acceleration may be decreased. In some embodiments, the acceleration may be continuously varied based on the grip quality.

If a ratio of the determined grip quality to the measured aggregate wrench is determined to be too low for a desired trajectory and/or acceleration, the ratio may be increased by improving the grip quality. For example, grip quality may be improved in a vacuum-based gripper by increasing the suction force of the cup assemblies, or by engaging more cup assemblies. Without wishing to be bound by theory, the grip quality of a vacuum-based gripper may be based, at least in part, on the pressure differential of each cup assembly and the total contact area of all cup assemblies engaged with the grasped object.

In some embodiments, computation and/or processing may be performed on-board the robotic gripper or the robotic arm. For example, the above-mentioned act of determining the aggregate wrench acting on the robotic gripper may be performed by one or more processors disposed on the robotic gripper. In embodiments in which there are multiple sensors, such as a force sensor to measure the aggregate wrench acting on the gripper, and a pressure sensor associated with each vacuum assembly, onboard computation may be used to fuse sensor data and inform a controller that determines the trajectory and/or acceleration profile of the robotic arm. Furthermore, integrating computation on the robotic gripper (or other end effector) may enable a more modular robotic arm, which may have benefits related to assembly, part replacement, and ease of operation.

In some embodiments, a method of determining grip quality between a robotic gripper and an object may further include determining that cup assemblies are within a threshold distance from the object. The method may also include applying vacuum to the cup assemblies when it is determined that the cup assemblies are within the threshold distance. In some embodiments, the threshold distance may be zero, such that vacuum may be applied when the cup assemblies are in contact with the object. In some embodiments, the threshold distance may be greater than zero, such that vacuum may be applied before the cup assemblies contact the object. A robotic gripper may include a distance sensor, such as a time-of-flight sensor, to determine the distance between the cup assemblies and the object.

Figure 7A:
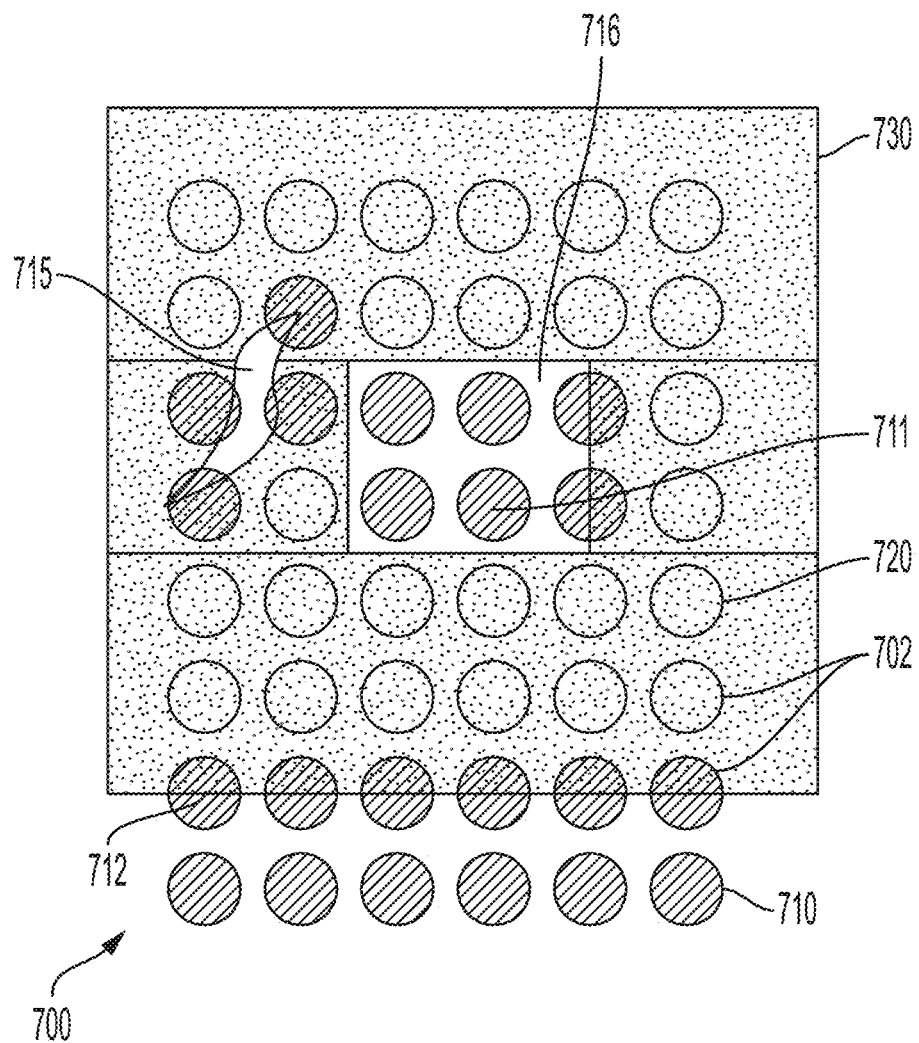
FIG. 7A illustrates a top schematic view of an example of a robotic gripper and an object.
Figure 7B:
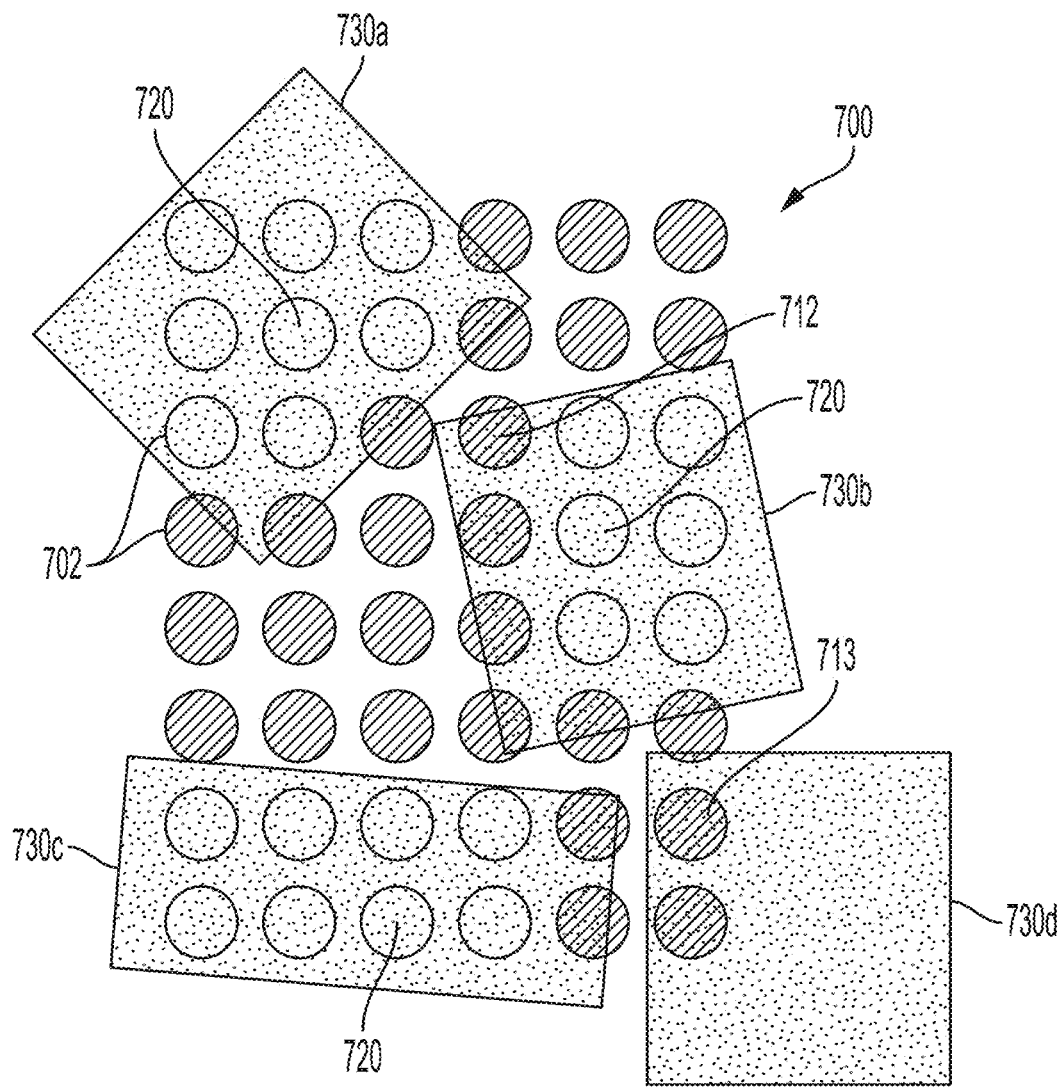
FIG. 7B illustrates a top schematic view of an example of a robotic gripper and a plurality of objects.
Figure 7C:
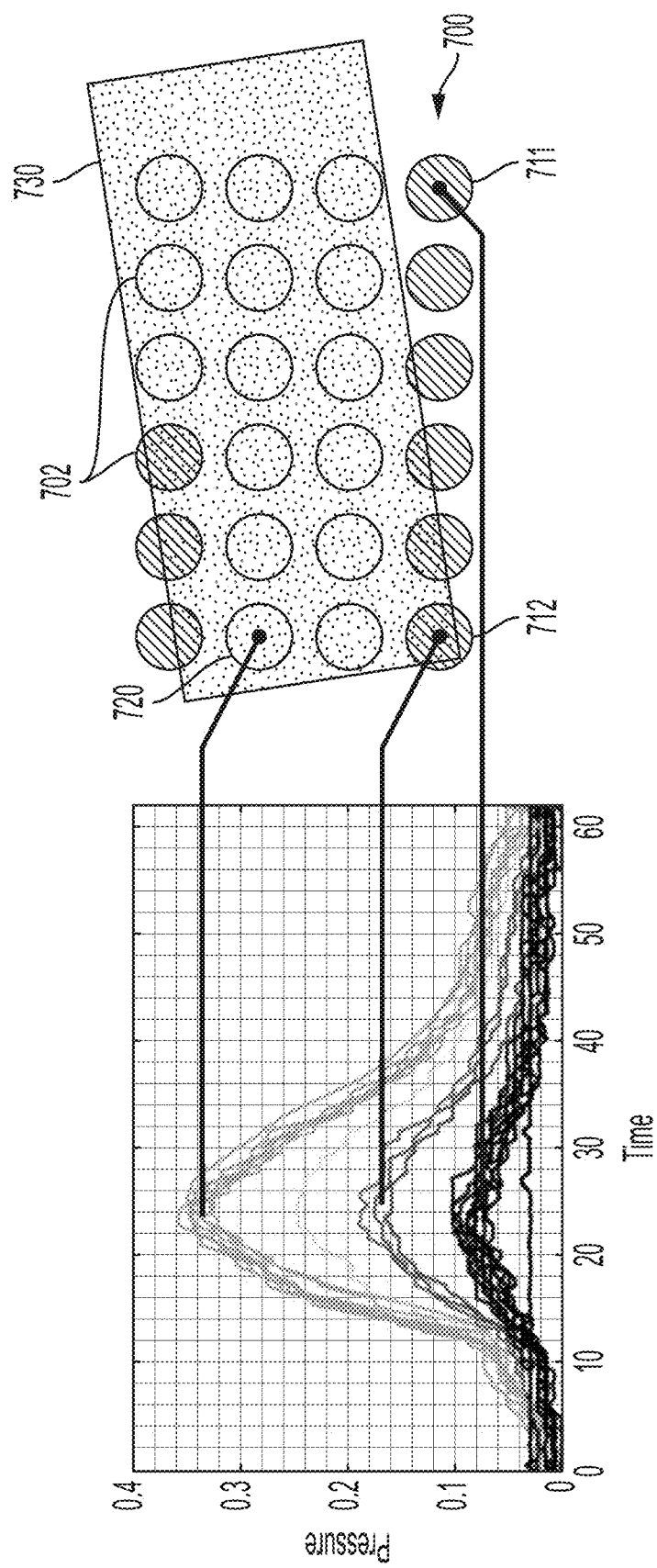
FIG. 7C illustrates a top schematic view of an example of a robotic gripper and an object and a corresponding plot of pressure values.

FIGS. 7A-7D illustrate schematically relationships between a contact state of a cup assembly and a determination of whether or not to activate that cup assembly in accordance with some embodiments. FIG. 7A is a top schematic view of one embodiment of a gripper 700 in contact with an object 730. The object 730 may, in some embodiments, be a box, such as a cardboard box. In some embodiments, the object 730 may include a plastic covering, such as an array of goods (e.g., cans) in a cardboard tray that has been shrink-wrapped with plastic. The object may include any number of defects or areas of damage 715 (e.g., creases, folds, dents, cuts, tears, etc.), or open portions 716. The gripper 700 includes a plurality of cup assemblies 702, which may include both deactivated cup assemblies 710 (e.g., cup assemblies to which no vacuum or minimal vacuum is supplied) and activated cup assemblies 720 (e.g., cup assemblies to which vacuum is supplied). In FIGS. 7A-7C, deactivated cup assemblies 710 are indicated with cross hatching, whereas activated cup assemblies 720 are indicated with open fill. It should be appreciated that while cup assemblies 702 are shown as either being activated or deactivated in FIGS. 7A-7C, the present disclosure is not limited to cup assemblies that are either activated (e.g., on) or deactivated (e.g., off). In some embodiments, the vacuum applied to cup assemblies may be adjusted continuously between any suitable number of states, rather than discretely between just two states (e.g., on and off).

Deactivated cup assemblies 710 may be deactivated based on one or more parameters. In some embodiments, a cup assembly may be deactivated if the sensed pressure within the cup assembly is below a threshold value. For example, a cup assembly that is not in contact with an object 730, such as cup assembly 711 which is arranged over open portion 716 in the object, may be deactivated. Similarly, a cup assembly that is only in partial contact with an object 730, such as cup assembly 712 which is arranged over an edge of the object, may be deactivated. A cup assembly that is in contact with a defect or area of damage 715 of the object 730 may be deactivated even if most or all of the cup assembly is in contact with the object 730, as the defect or area of damage 715 may prohibit the establishment of a good seal.

FIG. 7B schematically illustrates a scenario in which gripper 700 is arranged to move multiple objects (e.g., one or more of objects 730a-730d) at the same time. In some embodiments, a cup assembly may be deactivated even if the sensed pressure within the cup assembly is above a threshold value, and the cup assembly is able to form a good seal with the object. For example, cup assembly 713 of FIG. 7B may be deactivated even though the entire cup assembly 713 is in contact with (and makes a good seal with) an object 730d. In some embodiments, information captured by additional sensors (e.g., a camera) may be used to determine whether or not individual cup assemblies should be deactivated. For example, if it is determined based on one or more images captured by a camera that only a small number of cup assemblies are in contact with a given object, those cup assemblies may be deactivated even if the cup assemblies are able to achieve a good seal. Selectively deactivating cup assemblies even when they achieve a good seal may facilitate avoiding a scenario in which an object is dropped because the object is too heavy for the number of cup assemblies in contact with that object.

In some embodiments, activation/deactivation of one or more cup assemblies may be controlled using active valving, in which a processor or a controller may determine whether or not to open a valve. In some embodiments, such as embodiments in which cup assembly activation is determined by the pressure within the cup assembly, cup assemblies may include passive valving, in which the state of a valve may be determined based on pressure differentials, and a processor or a controller may not be needed. It should be appreciated that some grippers may include cup assemblies with active and/or passive valving, as the disclosure is not limited in this regard.

As depicted in FIG. 7B, a single gripper 700 may be configured to simultaneously engage with (e.g., grip) a plurality of objects 730a-730d. The objects 730a-730d may be of different shapes, sizes, or orientations, as the disclosure is not limited in this regard. The gripper 700 may selectively activate cup assemblies 702 such that only a subset of the plurality of objects 730a-730d are engaged (e.g., gripped) by the gripper 700. For example, cup assemblies in contact with the first three objects 730a-730c may be activated, while cup assemblies in contact with the fourth object 730d may be deactivated (the cup assemblies in partial contact with any object or not in contact with any object may be deactivated). In this way, the gripper 720 may simultaneously engage with a selected subset of the objects 730a-730d with which it is in contact. That is, during operation, the gripper 700 may contact a plurality of objects but only actively grip a chosen subset of those objects.

Figure 7D:
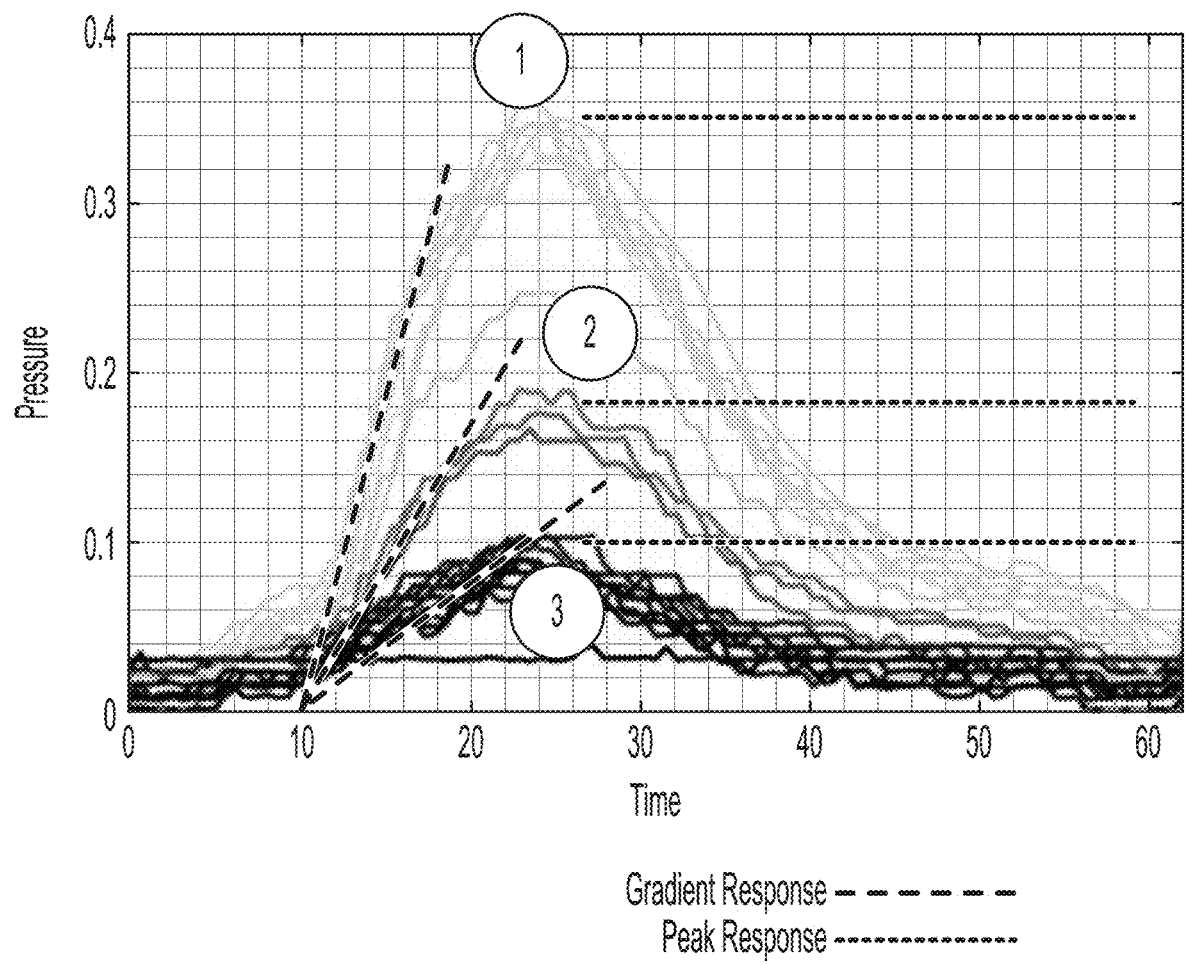
FIG. 7D is an annotated version of the plot of pressure values of FIG. 7C.

FIG. 7C depicts a gripper 700 gripping an object 730 along with a corresponding plot of the pressure within certain cup assemblies 702. FIG. 7D depicts the same graph of FIG. 7C, but with additional annotations. As discussed above, different cup assemblies 702 may be associated with different pressure levels, determined at least in part by the seal between the cup assembly and the object. 730. As shown in FIG. 7C, a cup assembly 720 with a good seal may be associated with a higher pressure than a cup assembly 712 with a partial seal, which may in turn be associated with a higher pressure than a cup assembly 711 with no seal. Accordingly, cup assembly 720 may be activated when the gripper grips the object, whereas cup assemblies 711 and 712 may be deactivated.

Referring to FIG. 7D, a determination of whether or not to activate a cup assembly may be based, at least in part, on the response of each cup assembly to a diagnostic vacuum pulse. Performing a diagnostic pulse may include briefly activating one or more cup assemblies, thereby supplying vacuum to the cup assemblies. The response may include data related to the pressure level in each cup assembly over time. The response of each cup assembly may be analyzed in relation to a peak pressure response, a gradient pressure response, or a combination thereof. The peak pressure response of a cup assembly may include the maximum or minimum pressure recorded by a pressure sensor associated with the cup assembly within a particular time range after the initiation of the pulse. For example, if a pulse lasts 15 milliseconds, the maximum or minimum value sensed by the pressure sensor within 50 milliseconds following the initiation of the pulse may be recorded as the peak pressure response. The gradient pressure response of a cup assembly may include the rate of change of the pressure signal within a cup assembly in response to a pulse. In some embodiments, the gradient pressure response may be determined in under 5 milliseconds.

Figure 8:
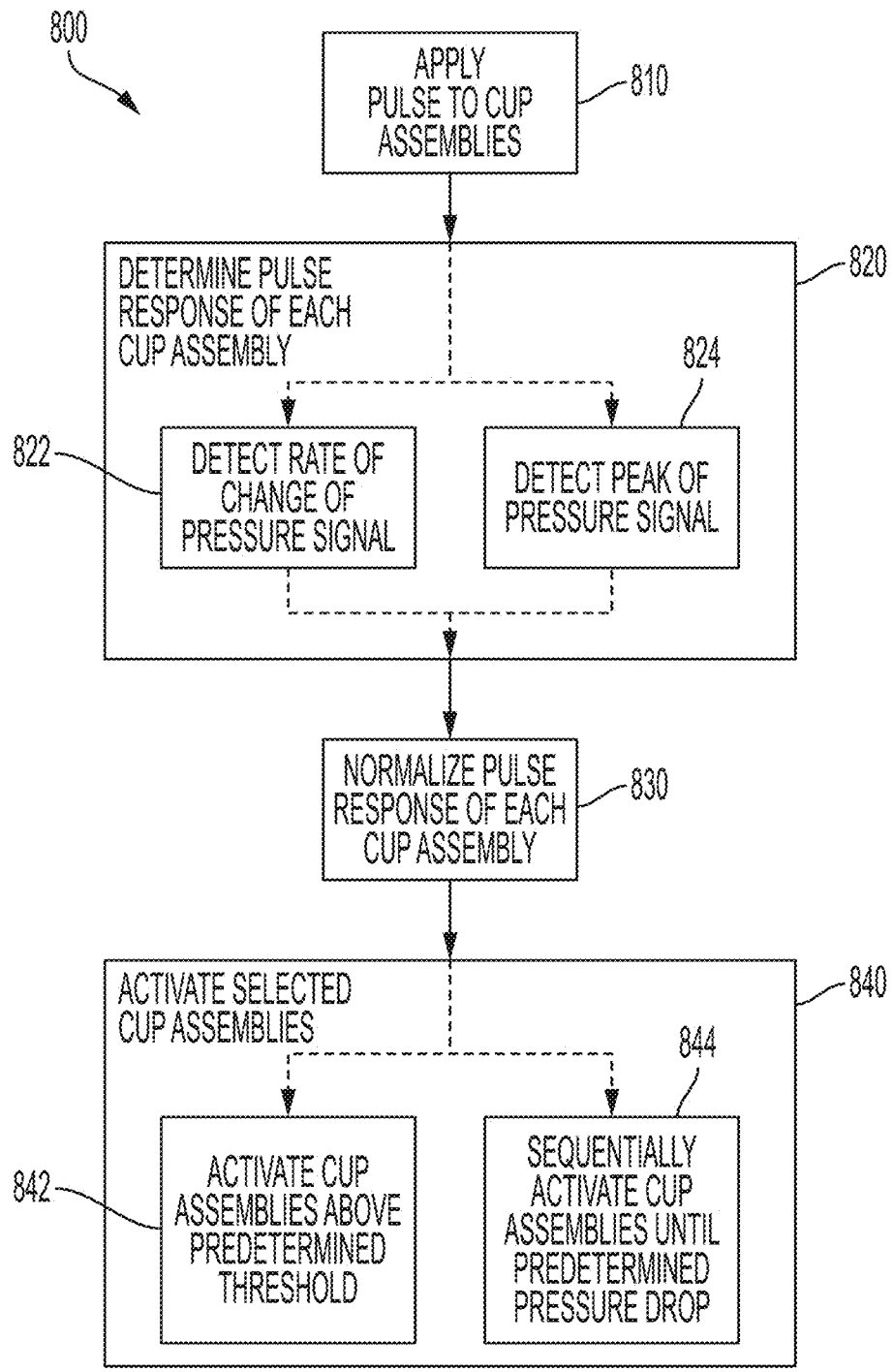
FIG. 8 illustrates an example of a process for determining which individual cup assemblies in a robotic gripper to activate.

FIG. 8 illustrates an example of a process 800 for determining which individual cup assemblies in a robotic gripper to activate in accordance with some embodiments. The process 800 begins in act 810, where a pulse is applied to the cup assemblies. As described above, pulsing the cup assemblies may include activating the cup assemblies for a short period of time (e.g., 15 milliseconds) before deactivating the cup assemblies again. Cup assemblies may be pulsed individually or in groups. In some embodiments, all cup assemblies of a robotic gripper may be pulsed simultaneously.

The process 800 then proceeds to act 820, where a pulse response of each cup assembly is determined. Determining the pulse response of each cup assembly may include detecting a rate of change (e.g., a slope) of the measured pressure signal, such as at act 822, and/or detecting a peak value of the pressure signal, such as at act 824. In some embodiments, both the rate of change and the peak value of the pressure signal may be detected and one or both of the rate of change and the peak value of the pressure signal may be used, at least in part, to determine whether to activate individual cup assemblies. For example, in some embodiments using the rate of change of the pressure signal may be preferable, but, if the rate of change information is unavailable for one or more cup assemblies, the peak value of the pressure signal may be used.

The process 800 then proceeds to act 830, where the pulse response of each cup assembly is normalized. For example, the pulse response of each cup assembly may be divided by the maximum recorded pulse response, such that the pulse response of each cup assembly may be associated with a normalized value ranging from 0 to 1. In the example where the pulse response is characterized in terms of the rate of change of the pressure signal of each cup assembly, normalization of the pulse responses of each cup assembly may include dividing the rate of change of the pressure signal for each cup assembly by the maximum rate of change of the pressure signal recorded over all cup assemblies of the robotic gripper. In the example where the pulse response is characterized in terms of the peak pressure signal of each cup assembly, normalization of the pulse responses of each cup assembly may include dividing the peak pressure signal for each cup assembly by the maximum peak pressure signal recorded over all cup assemblies of the robotic gripper.

The process 800 then proceeds to act 840, where selected cup assemblies are activated. In some embodiments, only those cup assemblies with a normalized value (e.g., rate of change, peak value, or both rate of change and peak value) above a threshold value may be activated, such as at act 842. For example, all cup assemblies with a normalized value above a threshold value (e.g., 0.5, 0.95) may be automatically activated. In some embodiments, the cup assemblies may be ranked based on their normalized value. The cup assemblies may be sequentially activated from the highest normalized value to the lowest normalized value until the overall system level pressure drops below a threshold value, at which point no additional cup assemblies are activated, such as at act 844. In some embodiments, a combination of these approaches may be employed. For example, all cup assemblies above a first threshold value (e.g., 0.95) may be automatically activated. Any cup assemblies below a second threshold value (e.g., 0.30) may automatically remain deactivated. Any cup assemblies below the first threshold value and above the second threshold value may be sequentially activated until a particular pressure drop is observed across the entire system of cup assemblies.

The computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware or with one or more processors programmed using microcode or software to perform the functions recited above.

In this respect, it should be appreciated that embodiments of a robot may include at least one non-transitory computer-readable storage medium (e.g., a computer memory, a portable memory, a compact disk, etc.) encoded with a computer program (i.e., a plurality of instructions), which, when executed on a processor, performs one or more of the above-discussed functions. Those functions, for example, may include control of the robot and/or driving a wheel or arm of the robot. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

The invention claimed is:

1. A method of selectively activating cup assemblies of a robotic gripper, the method comprising:
  applying a vacuum pulse to each of the cup assemblies;
  determining for each of the cup assemblies, while the vacuum pulse is applied to the cup assembly and using one or more pressure sensors, a pressure measurement for the cup assembly, wherein the pressure measurement comprises a rate of change of a pressure signal measured by the one or more pressure sensors and/or a peak pressure value of a pressure signal measured by the one or more pressure sensors; and
  selectively activating one or more of the cup assemblies based, at least in part, on the determined pressure measurements for the cup assemblies by sequentially activating cup assemblies until a target pressure drop is detected.

2. The method of claim 1, further comprising normalizing the pressure measurements for the cup assemblies, and selectively activating the one or more cup assemblies based, at least in part, on the normalized pressure measurements.

3. The method of claim 1, wherein determining the pressure measurement comprises determining the rate of change of a pressure signal measured by the one or more pressure sensors.

4. The method of claim 1, wherein determining the pressure measurement comprises determining the peak pressure value of the pressure signal measured by the one or more pressure sensors.

5. The method of claim 1, wherein selectively activating one or more of the cup assemblies based, at least in part, on the determined pressure measurements includes selectively activating one or more of the cup assemblies based, at least in part, on a pressure measurement threshold.

6. The method of claim 1, wherein applying a vacuum pulse to the cup assemblies includes simultaneously activating the cup assemblies for a fixed time period.

7. A robot, comprising:
a robotic gripper including a plurality of individually controllable cup assemblies; and
a controller configured to:
apply a vacuum pulse to each of the cup assemblies;
determine for each of the cup assemblies, while the vacuum pulse is applied to the cup assembly and using one or more pressure sensors, a pressure measurement for the cup assembly, wherein the pressure measurement comprises a rate of change of a pressure signal measured by the one or more pressure sensors and/or a peak pressure value of a pressure signal measured by the one or more pressure sensors; and
selectively activate one or more of the cup assemblies based, at least in part, on the determined pressure measurements for the cup assemblies by sequentially activating cup assemblies until a target pressure drop is detected.

8. The robot of claim 7, wherein the controller is further configured to normalize the pressure measurements for the cup assemblies, and selectively activate the one or more cup assemblies based, at least in part, on the normalized pressure measurements.

9. The robot of claim 7, wherein determining the pressure measurement comprises determining the rate of change of a pressure signal measured by the one or more pressure sensors.

10. The robot of claim 7, wherein determining the pressure measurement comprises determining the peak pressure value of the pressure signal measured by the one or more pressure sensors.

11. The robot of claim 7, wherein selectively activating one or more of the cup assemblies based, at least in part, on the determined pressure measurements includes selectively activating one or more of the cup assemblies based, at least in part, on a pressure measurement threshold.

12. The robot of claim 7, wherein applying a vacuum pulse to the cup assemblies includes simultaneously activating the cup assemblies for a fixed time period.

13. A non-transitory computer-readable storage medium encoded with instructions that, when executed by at least one processor perform a method of selectively activating cup assemblies of a robotic gripper, the method comprising:
applying a vacuum pulse to each of the cup assemblies;
determining for each of the cup assemblies, while the vacuum pulse is applied to the cup assembly and using one or more pressure sensors, a pressure measurement for the cup assembly, wherein the pressure measurement comprises a rate of change of a pressure signal measured by the one or more pressure sensors and/or a peak pressure value of a pressure signal measured by the one or more pressure sensors; and
selectively activating one or more of the cup assemblies based, at least in part, on the determined pressure measurements for the cup assemblies by sequentially activating cup assemblies until a target pressure drop is detected.

14. The non-transitory computer-readable storage medium of claim 13, wherein the method further comprises normalizing the pressure measurements for the cup assemblies, and selectively activating the one or more cup assemblies based, at least in part, on the normalized pressure measurements.

15. The non-transitory computer-readable storage medium of claim 13, wherein determining the pressure measurement comprises determining the rate of change of a pressure signal measured by the one or more pressure sensors.

16. The non-transitory computer-readable storage medium of claim 13, wherein determining the pressure measurement comprises determining the peak pressure value of the pressure signal measured by the one or more pressure sensors.

17. The non-transitory computer-readable storage medium of claim 13, wherein selectively activating one or more of the cup assemblies based, at least in part, on the determined pressure measurements includes selectively activating one or more of the cup assemblies based, at least in part, on a pressure measurement threshold.

18. The non-transitory computer-readable storage medium of claim 13, wherein applying a vacuum pulse to the cup assemblies includes simultaneously activating the cup assemblies for a fixed time period.

* * * * *